(12) United States Patent
Katamoto et al.

(10) Patent No.: US 6,285,842 B1
(45) Date of Patent: Sep. 4, 2001

(54) APPARATUS FOR SETTING IMAGE FORMING CONDITIONS

(75) Inventors: Koji Katamoto, Yamatokoriyama; Yasuji Nakahama, Tenri; Koki Fukuda, Nara; Akihiko Ito, Yamatokoriyama, all of (JP)

(73) Assignee: Sharp Kabishiki Kaisha, Osaka (JP)

( * ) Notice: Subject to any disclaimer, the term of this patent is extended or adjusted under 35 U.S.C. 154(b) by 0 days.

(21) Appl. No.: 09/553,655

(22) Filed: Apr. 21, 2000

(30) Foreign Application Priority Data

Apr. 21, 1999 (JP) .................................. 11-113324

(51) Int. Cl.⁷ ........................... G03G 15/00; G03G 21/00
(52) U.S. Cl. ................................. 399/81; 399/14
(58) Field of Search ................... 399/81, 82, 86, 399/14; 361/681

(56) References Cited

U.S. PATENT DOCUMENTS

| | | | |
|---|---|---|---|
| 5,565,964 | * 10/1996 | Tashiro et al. | 399/83 |
| 5,585,891 | * 12/1996 | Altrieth et al. | 399/81 |
| 5,950,045 | * 9/1999 | Nomura et al. | 399/81 |

FOREIGN PATENT DOCUMENTS

| | | | |
|---|---|---|---|
| 02-008922 | * | 1/1990 | (JP) . |
| 3-181958 | | 8/1991 | (JP) . |
| 5-100646 | | 4/1993 | (JP) . |
| 07-038686 | * | 2/1995 | (JP) . |

* cited by examiner

*Primary Examiner*—Sophia S. Chen
(74) *Attorney, Agent, or Firm*—Dike Bronstein, Roberts & Cushman IP Group; David G. Conlin; David A. Tucker

(57) ABSTRACT

An apparatus for setting image forming conditions includes: a display section having a display screen; a transparent touch-sensitive panel having a plurality of touch-sensitive keys and provided on the display screen for inputting the image forming conditions; and a display control section for controlling the display section and the touch-sensitive panel; wherein the display control section controls the display section to display a plurality of item selection keys in an item selection key area on the display screen for selection of condition items for setting the image forming conditions, to display a plurality of condition setting keys in a condition setting key area on the display screen for selection of options for a selected condition item, to display text information on current settings of the image forming conditions in a condition display area on the display screen, and to display an icon indicative of the current settings of the image forming conditions in an icon display area on the display screen; wherein the condition setting key area appears in response to selection of the condition item by operating in any of the item selection keys.

11 Claims, 29 Drawing Sheets

APPARATUS FOR SETTING IMAGE FORMING CONDITIONS

CROSS-REFERENCE TO RELATED APPLICATION

This application is related to Japanese Patent Application No. HEI 11(1999)-113324 filed on Apr. 21, 1999, whose priority is claimed under 35 USC §119, the disclosure of which is incorporated herein by reference in its entirety.

BACKGROUND OF THE INVENTION

1. Field of the Invention

The present invention relates to an apparatus for setting image forming conditions on a display screen for use in an image forming apparatus such as a copying machine or a printer and an image forming system including such an image forming apparatus in a network.

2. Description of the Related Art

In recent years, image forming apparatuses such as facsimiles and printers have become capable of performing increasingly diversified functions. When using such an image forming apparatus, an operator often desires to see how an image of a document original is to be formed on a recording sheet through a selected function. Exemplary functions herein include formation of a binding margin on the recording sheet and setting of copying conditions such as a copy scaling factor in a copying machine. In this respect, the conventional image forming apparatus is provided with a display device for displaying information on a currently selected function.

For improvement of the operability of the image forming apparatus, it is necessary to design the display device so that an operator can visually recognize items of image forming conditions and a portion of the display device to be operated for setting the image forming conditions as desired in a shorter time. Further, the display device should have a display area as small as possible for size reduction of the apparatus.

Japanese Unexamined Patent Publication No. HEI 5(1993)-100646, for example, discloses a display device for a copying machine which is adapted to process an image of a document original through various functions to form the processed image as a copy image on a sheet. The display device is adapted to display icons (schematic illustrations) such as a document icon which represents a document original carrying thereon an original image and a copy icon which represents a copy sheet carrying thereon a copy image to be obtained by processing the original image through a selected function.

Upon inputting of a plurality of copying conditions, the copy icon is displayed on the display device as representing a copy sheet to be obtained by processing the original image under the inputted copying conditions in sequence. Where a binding margin of 30 mm is inputted, for example, the document icon and the copy icon are respectively displayed on the display device as representing the document original and a copy sheet which carries thereon the original image with a binding margin of 30 mm. Where a scaling factor of 115% is further inputted, the document icon and the copy icon are respectively displayed on the display device as representing the document original and a copy sheet which carries thereon an image obtained by enlarging the original image by a scaling factor of 115% with a binding margin of 30 mm.

Further, Japanese Unexamined Patent Publication No. HEI 3(1991)-181958 discloses a display device which is adapted to display a plurality of items of copying conditions, for example, for setting an output destination, a stapling process, an image-carrying face of a copy sheet, a sheet type, a copy density, a copy scaling factor and the like, along with options for the respective copying condition items on a single display screen.

With this arrangement, the plural copying conditions can be set without switching the display screen.

With the arrangement of the display device disclosed in Japanese Unexamined Patent Publication No. HEI 5(1993)-100646, the time required for confirmation of the image forming conditions can be reduced by displaying the document icon and the copy icon, but no consideration is given to a screen configuration for allocation of operation members on the display screen. Therefore, this arrangement fails to achieve the reduction in the time required for the recognition of screen portions to be operated for the setting of the image forming conditions and the size reduction of the display screen of the display device.

Further, where the copy image to be obtained by processing the original image under the inputted image forming conditions has a greater size than the recording sheet, the display device fails to indicate this abnormal situation in the icon form. Therefore, the operator cannot easily realize that the settings of the image forming conditions are improper. If the operator starts performing an image forming operation under such improper image forming conditions, an unacceptable copy is made.

With the arrangement of the display device disclosed in Japanese Unexamined Patent Publication No. HEI 3(1991)-181958, the options for the plural items of the image forming conditions are displayed on the single display screen, so that the time required for the recognition of screen portions to be operated for setting the image forming conditions can be reduced. However, a great number of options for the respective condition items are displayed on the single display screen and, therefore, the display device inevitably has a greater display area. Since the options for all the condition items including those not selected by the operator are simultaneously displayed on the single display screen, it is troublesome to confirm the current settings of the image forming conditions.

SUMMARY OF THE INVENTION

In accordance with the present invention, there is provided an apparatus for setting image forming conditions for an image forming apparatus adapted to form on a recording sheet a copy image obtained by processing an original image under the image forming conditions, the condition setting apparatus comprising: a display section having a display screen; a transparent touch-sensitive panel having a plurality of touch-sensitive keys and provided on the display screen for inputting the image forming conditions; and a display control section for controlling the display section and the touch-sensitive panel; wherein the display control section controls the display section to display a plurality of item selection keys in an item selection key area on the display screen for selection of condition items for setting the image forming conditions, to display a plurality of condition setting keys in a condition setting key area on the display screen for selection of options for a selected condition item, to display text information on current settings of the image forming conditions in a condition display area on the display screen, and to display an icon indicative of the current settings of the image forming conditions in an icon display area on the display screen; wherein the item selection keys and the condition setting keys are provided in association with the touch-sensitive keys of the touch-sensitive panel; wherein the condition setting key area appears in response to selection of the condition item for setting an image forming condition for the selected condition item by selectively operating the touch-sensitive keys associated with the condition setting keys.

With this arrangement, the icon schematically representing the current settings of the image forming conditions and the text information on the current settings are displayed in the icon display area and in the condition display area, respectively, on the display screen and, when a condition item is selected, the condition setting keys are displayed on the display screen for setting an image forming condition for the selected condition item. Therefore, an operator can quickly confirm the current settings of the image forming conditions by viewing the icon, and further confirm the current settings by viewing the text information. When the image forming condition for the selected condition item is to be set, the condition setting keys are displayed along with the icon and the text information, so that confirmation of the current settings of the image forming conditions and selection of a different condition item can be achieved without switching the display screen.

DETAILED DESCRIPTION OF THE INVENTION

Figure 1:
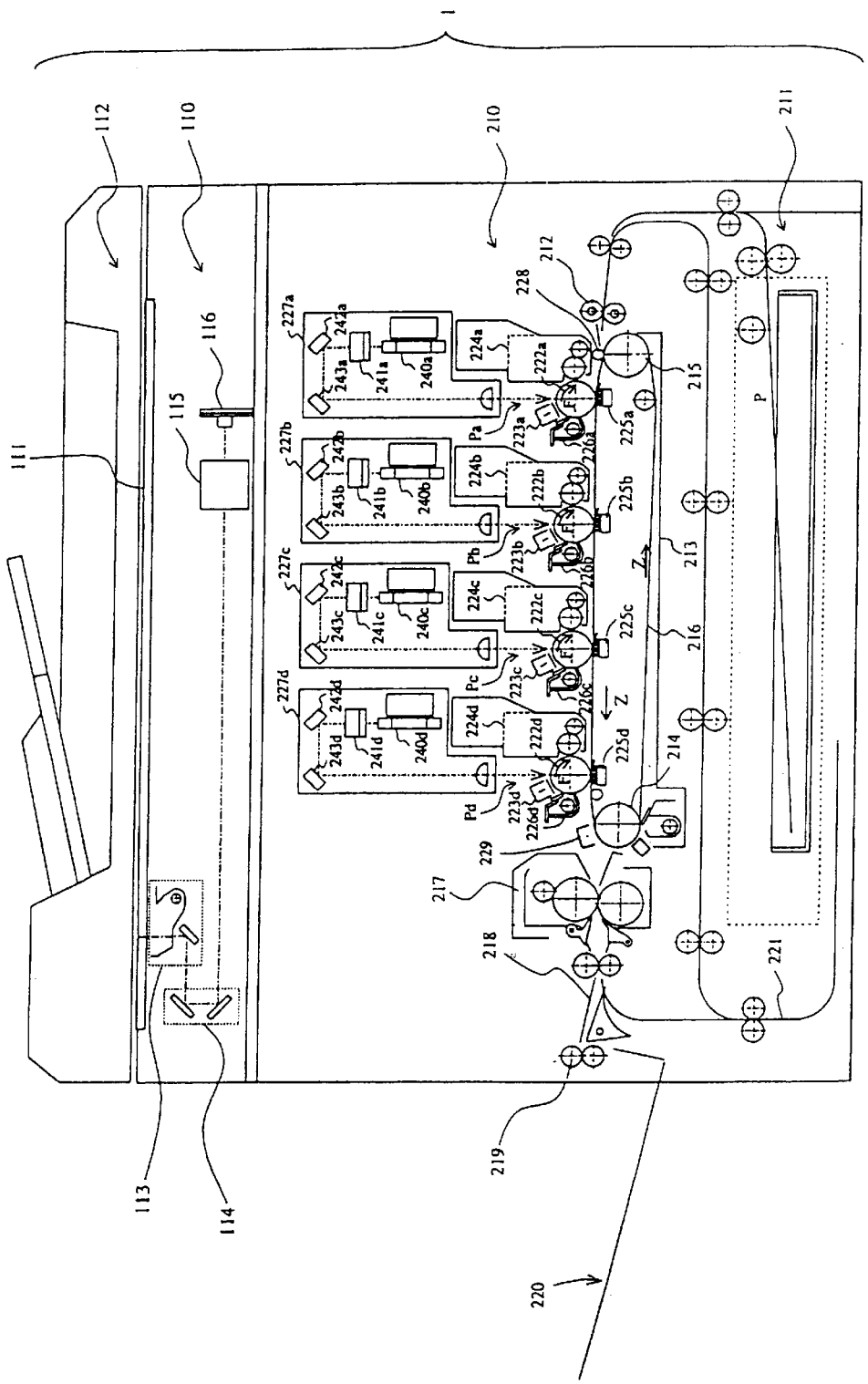
FIG. 1 is a front view in section schematically illustrating the construction of a digital copying machine as an image forming apparatus to which an apparatus for setting image forming conditions in accordance to a first embodiment of the present invention is applied.

The present invention is directed to an apparatus for setting image forming conditions for an image forming apparatus, which is capable of displaying information on the image forming conditions mainly in an icon form to indicate a positional relationship between an original image and a recording sheet and operating conditions for post-processing operations such as a punching operation and a stapling operation, so that an operator can easily check in a short time whether or not the image forming conditions such as a sheet size and the operating conditions for the post-processing operation are properly set, and easily find a screen portion (item selection key) to be operated for setting a desired condition. Thus, whether or not the settings of the image forming conditions are proper can easily be checked without the need for increasing the size of the display screen.

The apparatus for setting image forming conditions comprises: a display section having a display screen; a transparent touch-sensitive panel having a plurality of touch-sensitive keys and provided on the display screen for inputting the image forming conditions; and a display control section for controlling the display section and the touch-sensitive panel; wherein the display control section controls the display section to display a plurality of item selection keys in an item selection key area on the display screen for selection of condition items for setting the image forming conditions, to display a plurality of condition setting keys in a condition setting key area on the display screen for selection of options for a selected condition item, to display text information on current settings of the image forming conditions in a condition display area on the display screen, and to display an icon indicative of the current settings of the image forming conditions in an icon display area on the display screen; wherein the item selection keys and the condition setting keys are provided in association with the touch-sensitive keys of the touch-sensitive panel; wherein the condition setting key area appears in response to selection of the condition item for setting an image forming condition for the selected condition item by selectively operating the touch-sensitive keys associated with the condition setting keys.

The image forming conditions may include conditions for post-processing operations such as a stapling process (stapling position and number of staples) and a punching process (punching position).

With this arrangement, not only the image forming conditions which determine the state of an image to be formed on a recording sheet but also conditions for the post-processing operations to be performed on image-carrying sheets can easily be confirmed by viewing the icon displayed on the display section.

The display control section may control the display section to shift the icon display area or reduce the size of the icon display area on the display screen in response to the selection of the condition item.

With this arrangement, the condition setting key area in which the condition setting keys are displayed can be expanded to a sufficiently large size when the image forming condition for the selected condition item is to be set. Therefore, the condition setting keys can be displayed on the display screen along with the icon and the text information without the need for size increase of the display screen.

The display control section may control the display section to display an indicator on the display screen to indicate a relationship between an item selection key for the selected condition item displayed in the item selection key area and the condition setting keys displayed in the condition setting key area in response to the selection of the condition item.

With this arrangement, when a condition setting operation is to be performed on any of the plural condition items for setting the image forming conditions, the indicator allows for easy confirmation of the selected condition item.

The display control section may control the display section to locate the icon display area, the condition setting key area, the condition display area and the item selection key area in this order from the top to the bottom of the display screen in response to the selection of the condition item.

With this arrangement, neither the icon display area nor the condition display area are shaded with an operator's hand when the operator operates any of the condition setting keys or any of the item selection keys. Where the indicator is displayed in the condition display area in association with the item selection key for the selected condition item to indicate a relationship between the selected condition item and the condition setting keys, the relationship can easily and definitely be indicated on the display screen without significantly altering the configuration of the display screen.

The display control section may control the display section to display a copy icon indicative of a copy state in the icon display area on the display screen, the copy icon comprising a frame icon representing the recording sheet and having a size determined on the basis of a sheet size set as one of the image forming conditions and a copy image icon representing a copy image and having a size determined on the basis of an original document size and settings of the other image forming conditions, the frame icon and the copy image icon being displayed in a superposed relation with respect to a reference display position.

With this arrangement, a relationship between the sheet size and the copy image size determined on the basis of the settings of the image forming conditions is indicated by the copy icon. Therefore, the operator can quickly check whether or not the settings of the image forming conditions such as the sheet size and a copy scaling factor are proper by viewing the copy icon.

The copy icon may be an icon indicative of a dimensional relationship between the copy image and the sheet.

With this arrangement, the dimensional relationship between the copy image and the sheet is indicated by the copy icon irrespective of the actual sizes of the copy image and the recording sheet. Even if the actual sizes of the copy image and the recording sheet are variable in a wide range, there is no need to increase the size of the display screen to accommodate therein an excessively large copy icon or there is no possibility to display an excessively small copy icon with a lower legibility.

The copy icon indicative of the copy state may be an icon representing the dimensional relationship between the copy image and the sheet in any of three display forms.

Since the dimensional relationship between the copy image and the sheet is representing in any of the three display forms by the icon, the operator can quickly judge whether or not the settings of the image forming conditions are proper by viewing the icon.

The display control section may control the display section to display text information on the sheet size in association with the copy icon on the display screen.

With this arrangement, the text information on the sheet size is displayed along with the copy icon. Therefore, the operator can intuitively check whether or not the settings of the image forming conditions are proper by viewing the copy icon, and confirm the settings of the image forming conditions by viewing the text information.

The display control section may control the display section to display on the display screen a text message that the settings of the image forming conditions are improper, if the copy image icon has a size longitudinally or transversely incompatible with a size of the frame icon when the copy icon is displayed.

With this arrangement, the message indicative of improper settings of the image forming conditions is displayed along with the copy icon indicative of the copy state.

Therefore, whether or not the settings of the image forming conditions are proper can intuitively be checked by viewing the icon, and checked again by viewing the text message.

Embodiments of the present invention will hereinafter be described in detail with reference to the attached drawings. It should be understood that the invention be not limited to these embodiments.

FIG. 1 is a front view in section schematically illustrating the construction of a digital copying machine as an image forming apparatus to which an apparatus for setting image forming conditions in accordance with a first embodiment of the present invention is applied. A document platen 111 and an operation panel to be described later are provided on the top of a main body 1 of the copying machine. An automatic document feeder (ADF) 112 openably covers a top surface of the document platen 111. An image reading section 110 and an image forming section 210 are provided within the copying machine body 1.

The automatic document feeder 112 covering the top surface of the document platen 111 is capable of feeding single or plural two-sided document originals onto the document platen 111 from a document tray, and adapted to selectively perform a one-sided document transporting operation in which only one image-carrying face of a document original is opposed to the top surface of the document platen 111 and a double-sided document transporting operation in which opposite image-carrying faces of a document original are successively opposed to the top surface of the document platen 111 by reversing the document original, in accordance with an operator's choice. The document transporting operations and the document reversing operation are controlled in association with operations of the copying machine body 1.

The document reading section 110 reads an image on an image-carrying face of a document original opposed to the document platen 111. The image reading section 110 includes a first mirror base 113 having a light source and a first mirror, a second mirror base 114 having second and third mirrors, a lens 115 and a photoelectric converter 116. The first mirror base 113 is adapted to reciprocally travel along an under surface of the document platen 111 at a predetermined speed, and the second mirror base 114 is adapted to reciprocally travel along the under surface of the document platen 111 at one half the speed of the first mirror base. Thus, light from the light source is reflected on the image-carrying face of the document original and further reflected on the first to third mirrors to reach the lens 115. The lens 115 focuses the light reflected from the image-carrying face of the document original on a light receiving surface of the photoelectric converter 116. The photoelectric converter 116 outputs light reception voltage signals which depend on the amount of the light received by the light receiving surface. The light reception signals outputted from the photoelectric converter 116 are subjected to a predetermined process in an image processing section not shown, and supplied as image data to imaging units to be described later.

The image forming section 210 includes an endless transfer/transport belt 213 stretched between a driving roller 214 and a driven roller 215, image forming stations Pa, Pb, Pc, Pd disposed in juxtaposition above the transfer/transport belt 213, and a fixing unit 217 disposed in the vicinity of the transfer/transport belt 213 on the side of the driving roller 214. The transfer/transport belt 213 is rotated in an arrow direction Z, and is adapted to transport on its upper surface a sheet P fed from a sheet feeding portion 211 disposed below the image forming section 210 in the copying machine body 1 toward the fixing unit 217 while opposing the sheet P sequentially to the respective image forming station Pa to Pd. The sheet P is initially fed onto the transfer/transport belt 213 in synchronism with the operation of the image forming station Pa by a registration roller 212. The sheet P is imparted with a charge by a discharge roller 228 so as to be electrostatically attracted onto the surface of the transfer/transport belt 216.

The image forming stations Pa to Pb have substantially the same construction. The image forming station Pa, for example, includes a photoreceptor drum 222a, a charger 223a, a developing unit 224a, a transfer brush 225a, a cleaner 226a and an imaging unit 227a. The photoreceptor drum 222a has a photoconductive layer provided on its surface, and is rotated in an arrow direction F at a predetermined speed. The discharger 223a uniformly imparts the surface of the photoreceptor drum 222a with a charge of a single polarity by corona discharge. The imaging unit 227a directs a laser beam onto a surface of the photoreceptor drum 222a via a polygon mirror 240a, a fθ-lens 241a and mirrors 242a, 243a on the basis of the image data supplied from the image processing section. Therefore, it will be understood that the image forming stations Pb to Pd each contain equivalent elements to those just described, the reference numerals used to designate each element being differentiated from one another by the association of the letters "b", "c" or "d" therewith so as to signify to which of the image stations the particular element belongs (e.g., 222b, 222c, 222d, 223b, 223c, 223d, 225b, 225c, 225d, 226b, 226c, 226d, 240b, 240c, 240d, 241b, 241c, 241d, 242b, 242c, and 242d, respectively).

Thus, an electrostatic latent image is formed on the surface of the photoreceptor drum 222a by a photoconductive effect. The developing unit 224a supplies a developer onto the surface of the photoreceptor drum 222a exposed to the laser beam, and develops the electrostatic latent image formed on the surface of the developer drum 222a into a toner image. The toner image carried on the surface of the photoreceptor drum 222a is transferred onto a surface of the sheet P by the transfer brush 225a. After the completion of the transfer of the toner image, residual developer is removed from the surface of the photoreceptor drum 222a by the cleaner 226a, and then imparted with a charge by the charger 223a. The photoreceptor drum 222a is repeatedly used for formation of an electrostatic latent image and a toner image.

The developer units 224a to 224d provided in the image forming stations Pa to Pd respectively contain yellow, magenta, cyan and black developers. The imaging units 227a to 227d provided in the image forming stations Pa to Pd are respectively supplied with yellow, magenta, cyan and black image data from the image processing section. Therefore, yellow, magenta, cyan and black toner images are respectively formed in the image forming stations Pa to Pd, and successively transferred onto the surface of the sheet P transported sequentially to the image forming stations Pa to Pd by the transfer/transport belt 216. Thus, the yellow, magenta, cyan and black toner images are superposed on the sheet P to form a full-color image on the sheet P.

The sheet P carrying the respective color toner images transferred thereon for the formation of the full-color image is removed from the surface of the transfer/transport belt 216 by removal of the electrostatic attractive force by a separator 229, and then transported to the fixing unit 217. The fixing unit 217 fuses the developers on the sheet P by heat and pressure for fixation of the toner images on the sheet. In a one-side image formation mode in which an image is to be formed on one side of a sheet, the sheet P transported through the fixing unit 217 is discharged to a sheet discharge tray 220 by sheet discharge rollers 219. In a two-side image formation mode in which images are to be formed on both sides of a sheet P, the sheet P carrying the toner images on one side thereof is transported into a switch-back transporting path 221 via a flapper 218 so as to be turned upside down, and transported again on the upper surface of the transfer/transport belt 216. Thus, another image is formed on the back side of the sheet P, which is in turn discharged to the discharge tray 220 by the discharge rollers 219.

Figure 2:
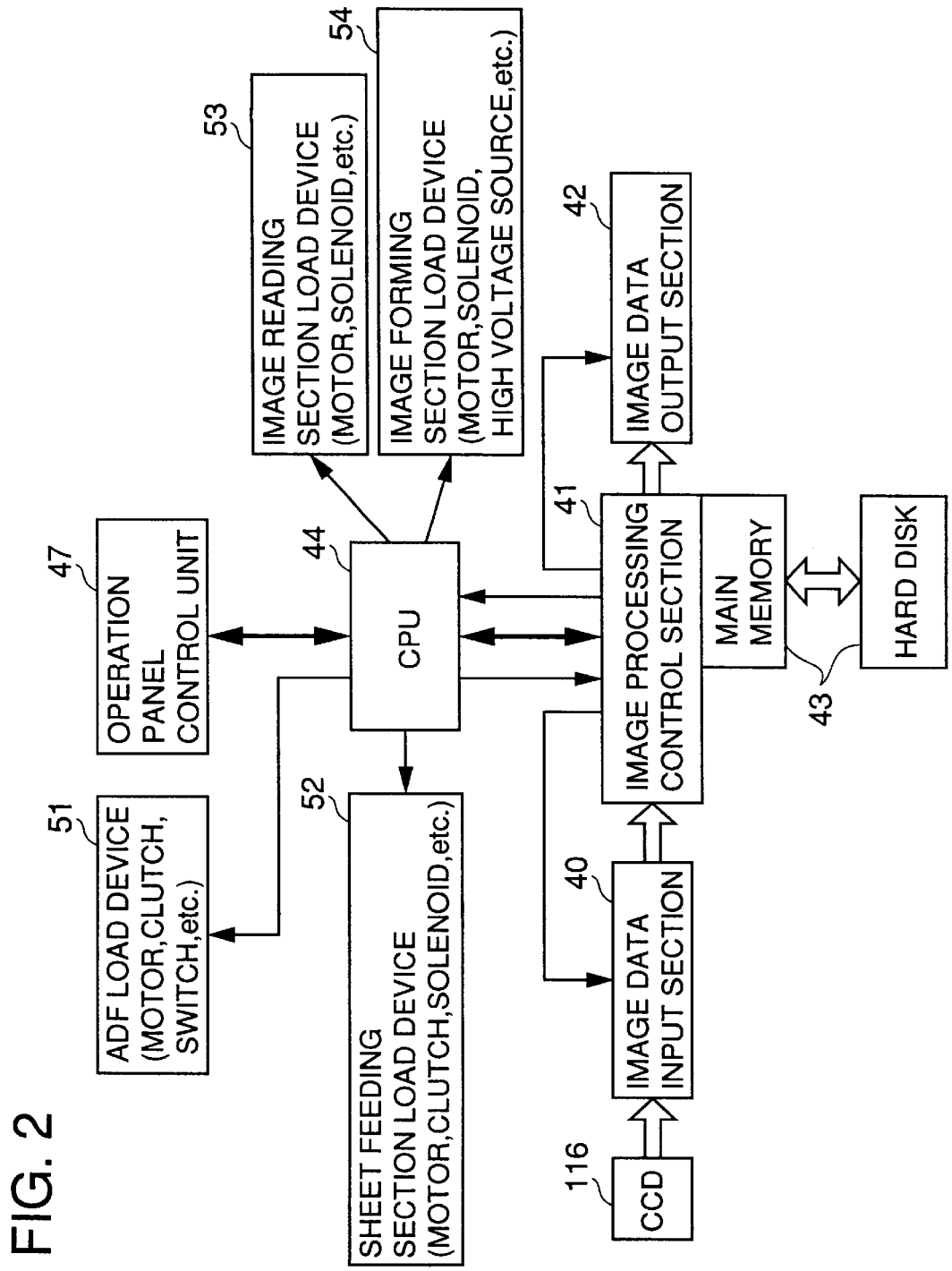
FIG. 2 is a block diagram illustrating the construction of a control section of the copying machine.

FIG. 2 is a block diagram illustrating the construction of a control section of the copying machine. The control section of the copying machine 1 includes a CPU 44, and an image processing control section 41 and an operation panel control unit 47 connected to the CPU 44. An ADF load device 51, a sheet feeding section load device 52, an image reading section load device 53 and an image forming section load device 54 are connected to the CPU 44. The image processing control section 41 performs a predetermined image processing operation on the image data inputted from the photoelectric converter (CCD) 116 via an image data input section 40, and then supplies the processed image data to the imaging units 227a to 227d via an image data output section 42 as described above. The image processing control section 41 includes a storage section 43 comprised of a main memory and a hard disk for temporarily storing therein the image data before the image processing operation.

Operation data on image forming conditions inputted through the operation panel by an operator is inputted to the CPU 44 via the operation panel control unit 47. The CPU 44 outputs control data to the ADF load device 51, the sheet feeding section load device 52, the image reading section load device 53 and the image forming section load device 54 on the basis of the operation data so as to cause the copying machine body 1 to operate in accordance with the image forming conditions inputted by the operator. The CPU 44 outputs display data to the operation panel control unit 47 in accordance with the image forming conditions inputted by the operator. The operation panel control unit 47 serves as a display control section to control a display provided on the operation panel on the basis of the display data inputted from the CPU 44. Thus, the operator can confirm the operation state of the copying machine and the image forming conditions by viewing information displayed on the display.

Figure 3:
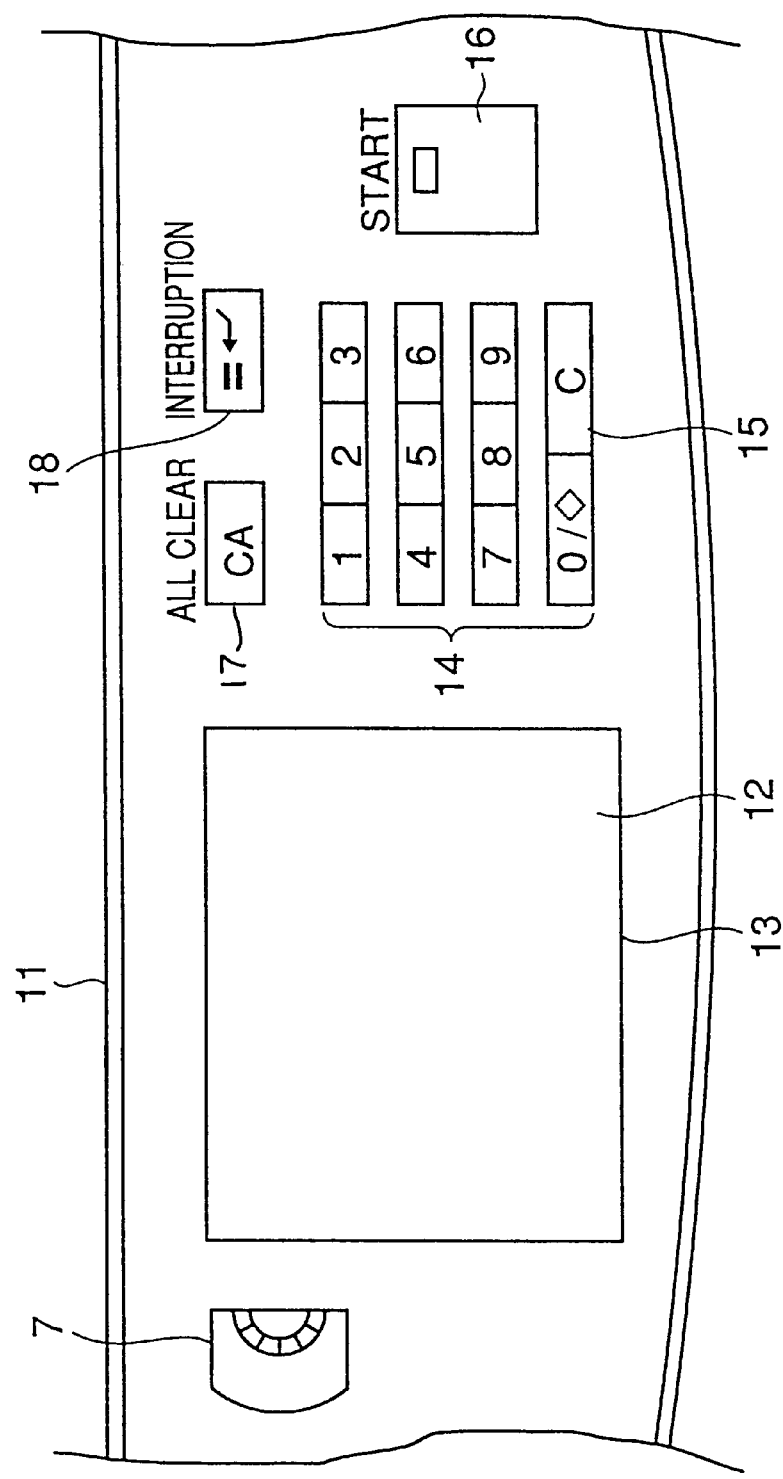
FIG. 3 is a plan view illustrating the construction of a major portion of a control panel of the copying machine.

FIG. 3 is a plan view illustrating the construction of a major portion of the control panel of the copying machine. The display 13 is disposed in a central portion of the operation panel 11 provided on the top of the copying machine body 1, and a transparent touch-sensitive panel 12 is provided on a surface of the display 13. Provided on the right side of the display 13 on the operation panel 11 are numeric keys 14 to be pressed for inputting numeric data such as the number of copies, a clear key 15 to be pressed for clearing the numeric data inputted through the numeric keys 14 and for canceling a sequential copying operation, a start key 16 to be pressed for starting a copying operation, an all-clear key 17 to be pressed for canceling all the current settings of the image formation conditions to restore initial conditions, and an interruption key 18 to be pressed for interrupting the sequential copying operation to perform a copying operation on another document original. On the left side of the display 13, a dial 7 is provided for adjusting the brightness of a display screen of the display 13.

Figure 4:
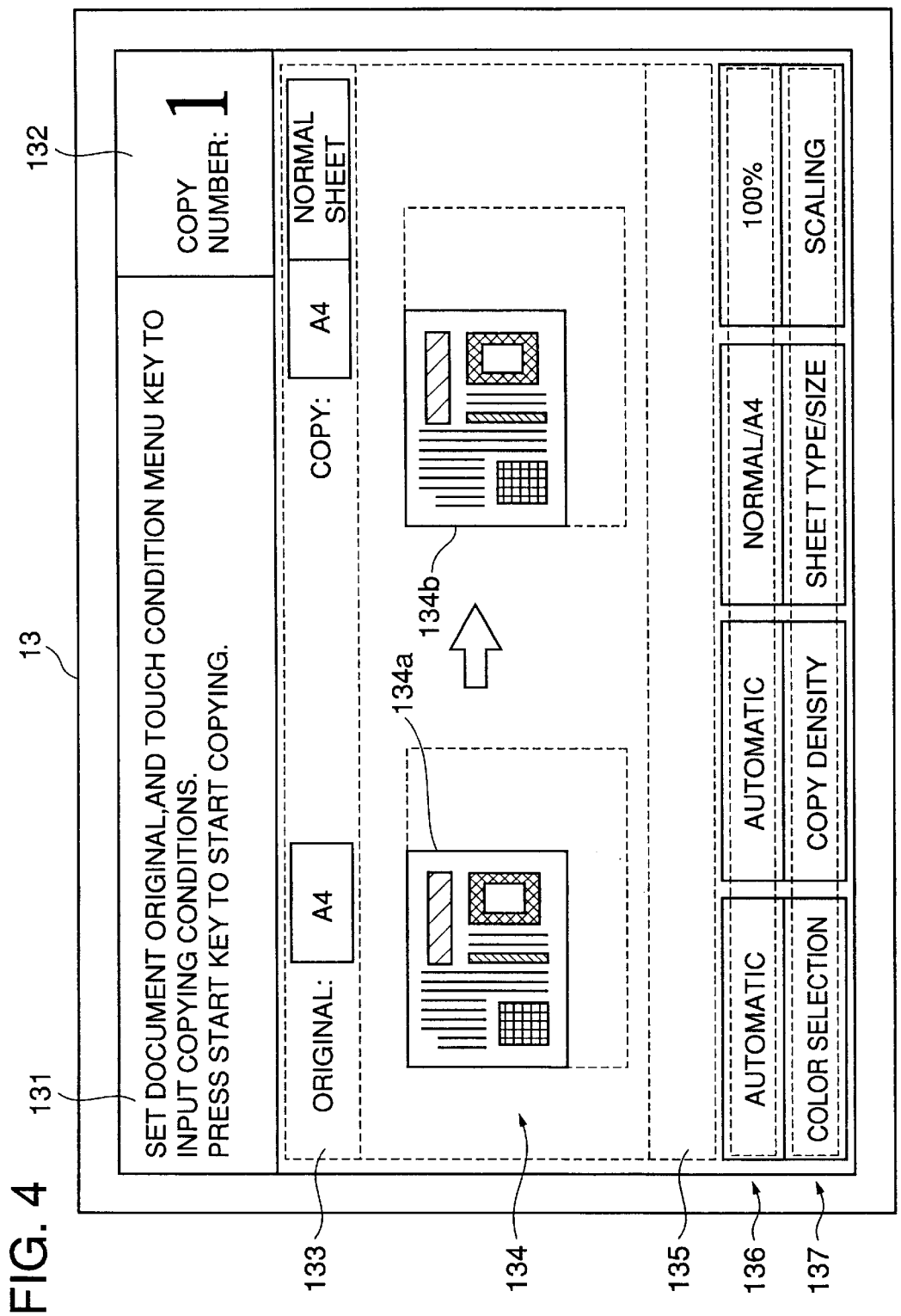
FIG. 4 is a diagram illustrating a display screen of a display provided on the control panel of the digital copying machine.

FIG. 4 is a diagram illustrating a display screen of the display provided on the control panel of the digital copying machine. A message area 131 and a copy number display area 132, an auxiliary information display area 133, an icon display area 134, a condition selection area (condition setting key area) 135, a condition display area 136, and a condition menu key area (item selection key area) 137 are located in this order from the top to the bottom on the display screen of the display 13 on which the transparent touch-sensitive panel 12 is provided.

In the message area 131, a text message for an operation is displayed in accordance with the current operating situation. In the copy number display area 132, a copy number inputted by operating the numeric keys is displayed.

A color selection key 137a for selection of a copy image color setting menu, a copy density key 137b for selection of a copy image density setting menu, a sheet type/size key 137c for selection of a sheet type/size setting menu, and a scaling key 137d for selection of a scaling factor setting menu for setting a size ratio of a copy image to an original image (scaling factor) are disposed in the condition menu key area 137 located at the bottom. When any of the keys 137a to 137d displayed on the display 13 is operated for selection of a copying condition setting menu, keys for options for the copy condition setting menu assigned to the operated key are displayed in the condition selection area 135.

For example, options for the copy image color setting menu assigned to the key 137a include a full-color mode for formation of a color copy image on the basis of a color original image, a mono-color mode for formation of a mono-color copy image with a single color other than black, a monochrome mode for formation of a monochrome black copy image, and an automatic selection mode in which a full-color mode or a monochrome mode is automatically selected on the basis of the result of detection of an original image. Therefore, when the key 137a is operated, keys for these modes are displayed in the condition selection area 135.

Options for the copy image density setting menu assigned to the key 137b include an automatic density setting mode in which the density of a copy image is automatically determined on the basis of a sensed original image density, a manual density setting mode in which the density of a copy image is manually selected from a plurality of preset density levels, and a photograph mode in which a copy image of a photographic original or the like is formed with a density gradation. Therefore, when the key 137b is operated, keys for these modes are displayed in the condition selection area 135.

Options for the sheet type/size setting menu assigned to the key 137c include a manual sheet type setting mode in which the sheet type is manually selected from a normal sheet and a coated sheet, a manual sheet size setting mode in which the sheet size is manually selected from A3 size, B4 size, A4 size, B5 size and the like, and an automatic sheet size setting mode in which the sheet size is automatically determined on the basis of the size of a document original and the copy scaling factor. Therefore, when the key 137c is operated, keys for the plural sheet types, the plural sheet sizes and the automatic mode are displayed in the condition selection area 135.

Options for the copy scaling factor setting menu assigned to the key 137d include a manual scaling factor setting mode in which the copy scaling factor is manually selected from preset scaling factors such as 70%, 81%, 86%, 100%, 115%, 121% and 141%, and an automatic scaling factor setting mode in which the copy scaling factor is automatically determined on the basis of the size of the document original and the sheet size. Therefore, when the key 137d is operated, keys for the plural preset scaling factors and the automatic mode are displayed in the condition selection area 135.

Current settings for the respective condition setting menus assigned to the keys 137a to 137d are displayed in association with the respective keys in the condition display area 136. Where the operator does not specifically make settings for any of the condition setting menus, default settings are displayed in the condition display areas 136. For example, the automatic mode for the copy image color setting menu, the automatic mode for the copy image density setting menu, the A4-size normal sheet copy mode for the sheet type/size setting menu, and a preset scaling factor of 100% (original size) for the copy scaling factor setting menu are employed as the default settings.

Icons pictorially representing some of the copying conditions set by operating the condition setting keys are displayed in the icon display area 134. More specifically, a document icon 134a schematically representing a document original and a copy icon 134b schematically representing a sheet carrying a copy image thereon are displayed in the icon display area 134. When a copying condition is inputted which influences the state of the original image and the state of the copy image, the copying condition is pictorially reflected on the document icon 134a and the copy icon 134b.

In the copy icon 134b, a frame icon indicative of a currently selected sheet size is superposed on an image icon indicative of a copy image size determined on the basis of a document size sensed on the document platen 111 or on the document tray of the ADF 112 (document placement portion), with respect to a reference display position. Thus, a sheet formed with a copy image is schematically represented by the copy icon 134b.

The reference display position to be employed for the superposition of the frame icon on the image icon corresponds to a registration position at which the sheet is registered with respect to the image forming stations Pa to Pd in the image forming section 210. More specifically, a left edge of the frame icon is registered with a left edge of the image icon with respect to a sheet transport direction. With respect to a direction perpendicular to the sheet transport direction, a center line of the frame icon is registered with a center line of the image icon where the sheet transportation is based on a center line of the sheet, or a rearward edge of the frame icon is registered with a rearward edge of the image icon where the sheet transportation is based on a rearward edge of the sheet.

The document icon and the copy icon displayed on the display also indicate the orientation of the document original placed on the document platen or the document tray of the ADF (document placement portion) and the orientation of the copy sheet to be discharged on the discharge tray 220, as viewed from the front side. Where an A4-size (default size) sheet is accommodated in the sheet feeding portion 211 with its longitudinal axis aligning along the transport direction, for example, the sheet is discharged onto the discharge tray 220 in a landscape orientation after image formation as viewed from the front side, so that the copy icon is displayed in a landscape orientation as shown in FIG. 4. Where no document original is placed on the document placement portion, the document icon is displayed in the same orientation as the copy icon. When a document original is placed on the document placement portion, the document icon is displayed in a landscape or portrait orientation in accordance with the actual orientation of the document original.

Some of the copying conditions inputted by operating the condition setting keys are not pictorially displayed but in the form of text information in the auxiliary information display area 133 in such a manner that relationships thereof with respect to the document icon 134a and the copy icon 134b can definitely be indicated. Therefore, the copying conditions inputted by the operation of the condition setting keys are collectively displayed in the icon display area 134 and the auxiliary information display area 133, so that the operator can easily confirm the settings of the copying conditions at a glance. The copying conditions which are displayed in the icon form in a visually recognizable manner can quickly be confirmed visually.

More specifically, the sheet type/size among the copying conditions cannot definitely be represented only by the copy icon 134b, so that "A4" and "NORMAL SHEET" are displayed as text information in the auxiliary information display area 133 in association with the copy icon 134b to indicate that the current setting of the sheet type/size is an A4-size normal sheet. Further, a sensed document size which cannot definitely be represented by the document icon 134a is displayed as text information in the auxiliary information display area 133 in association with the document icon 134a.

In the icon display area 134, the document icon 134a and the copy icon 134b are displayed in any of nine display sizes for four regular sheet sizes including A3, B4, A4 and B5 sizes, and five irregular sheet sizes including a size greater than A3 size, a size smaller than B5 size and intermediate sizes between the respective regular sizes.

When the copying machine body 1 is on standby for the image forming operation, no document original is placed on the top surface of the document platen 111, so that document size detection data is not present. In this case, text information of "A4" indicative of a document size (A4) determined on the basis of default settings of the sheet size (A4) and the copy scaling factor (100%) is displayed in the auxiliary information display area 133 in association with the document icon 134a, and the document icon 134a is displayed in a display size corresponding to the determined document size (A4) in the icon display area 134.

FIG. 4 illustrates a screen to be displayed on the display 13 with the copying machine body 1 being on standby for the copying operation. Information displayed in the respective areas 131 to 137 on the screen of the display 13 is varied in accordance with the state of the copying machine body 1 operated by the operator.

Figure 5:
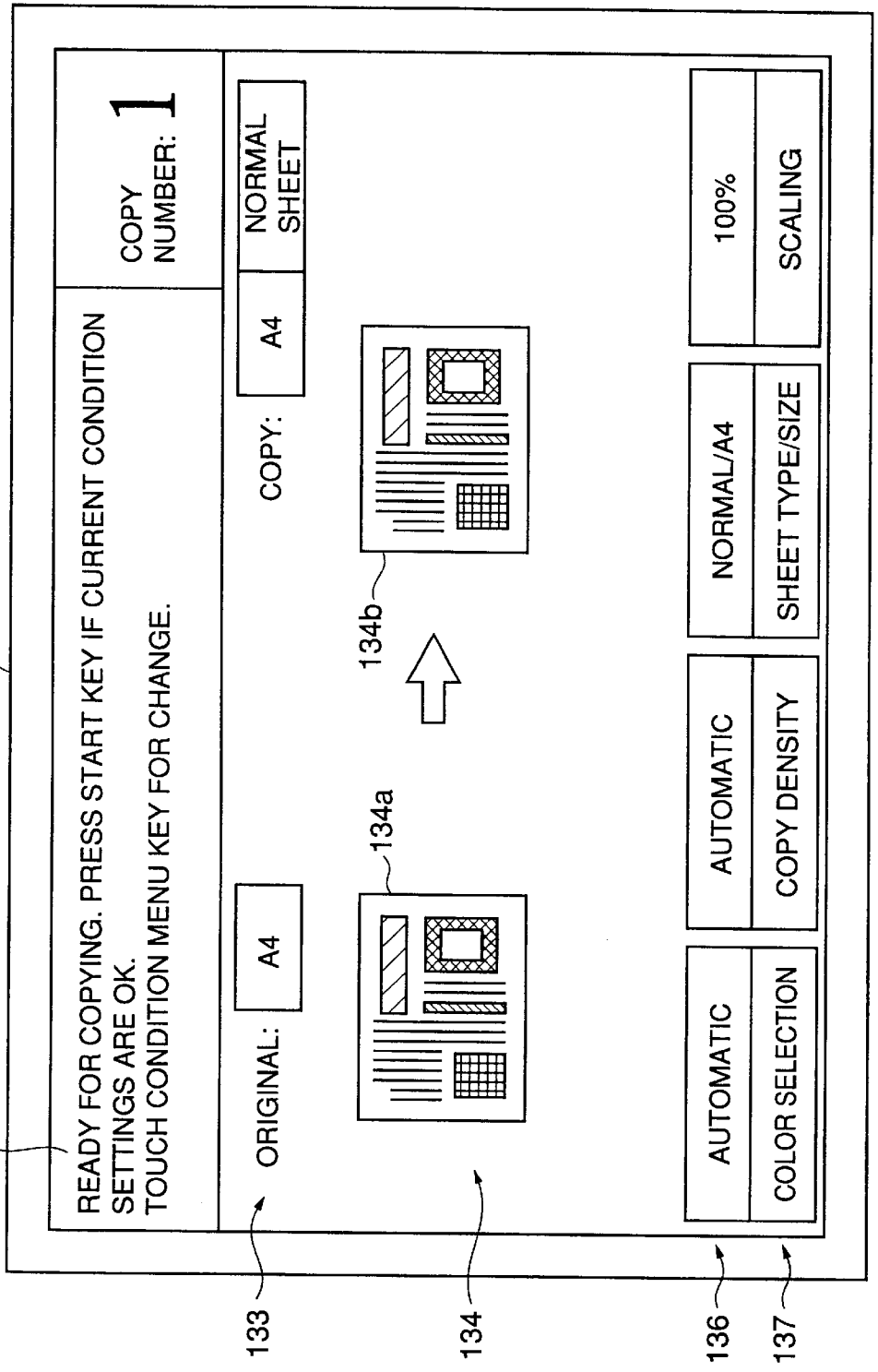
FIG. 5 is a diagram illustrating one exemplary screen to be displayed on the display after a document original is placed on a document placement portion.

FIG. 5 is a diagram illustrating one exemplary screen to be displayed on the display after a document original is placed on the document placement portion. The display screen indicates that an A4 size document original is placed on the document platen 111 or on the document tray of the ADF 112 (document placement portion). When the size (A4) of the document original placed on the document platen 111 or the document tray is sensed by a detector, the size of the document icon 134a to be displayed in the icon display area 134 on the display 13 and text information on the document size to be displayed in the auxiliary information display area 133 are determined on the basis of the sensed document size, and the document icon 134a having the size thus determined and the text information of the document size are displayed in the respective display areas.

The orientation of the document icon is changed depending on the orientation of the document original placed on the document placement portion as viewed from the front side. In this case, the document original is placed in the same orientation as the document icon currently displayed, so that the orientation of the document icon is not changed.

As described above, the copy icon 134*b* is displayed in such a state that the frame icon having a size corresponding to the sheet size is superposed on the image icon having a size corresponding to the copy image size determined by the document size and the copy scaling factor with respect to the reference display position. In FIG. 5, the sheet size (A4) matches with the copy image size (A4) determined by multiplying the document size (A4) by the copy scaling factor (100%), so that the copy icon 134*b* is displayed with the frame icon and the image icon being completely overlapped with each other. By viewing the copy icon 134*b*, the operator instantaneously finds that the document size, the sheet size and the copy scaling factor are consistent with each other.

Since the sensed document size (A4), the sheet size (A4) of the default setting and the copy scaling factor (100%) of the default setting are consistent with each other, a message that the copying operation can be started by operating the start key 16 is displayed in the message area 131 for confirmation. By viewing the information displayed in the message area 131, the operator can confirm again that the document size, the sheet size and the copy scaling factor are properly set.

Figure 6:
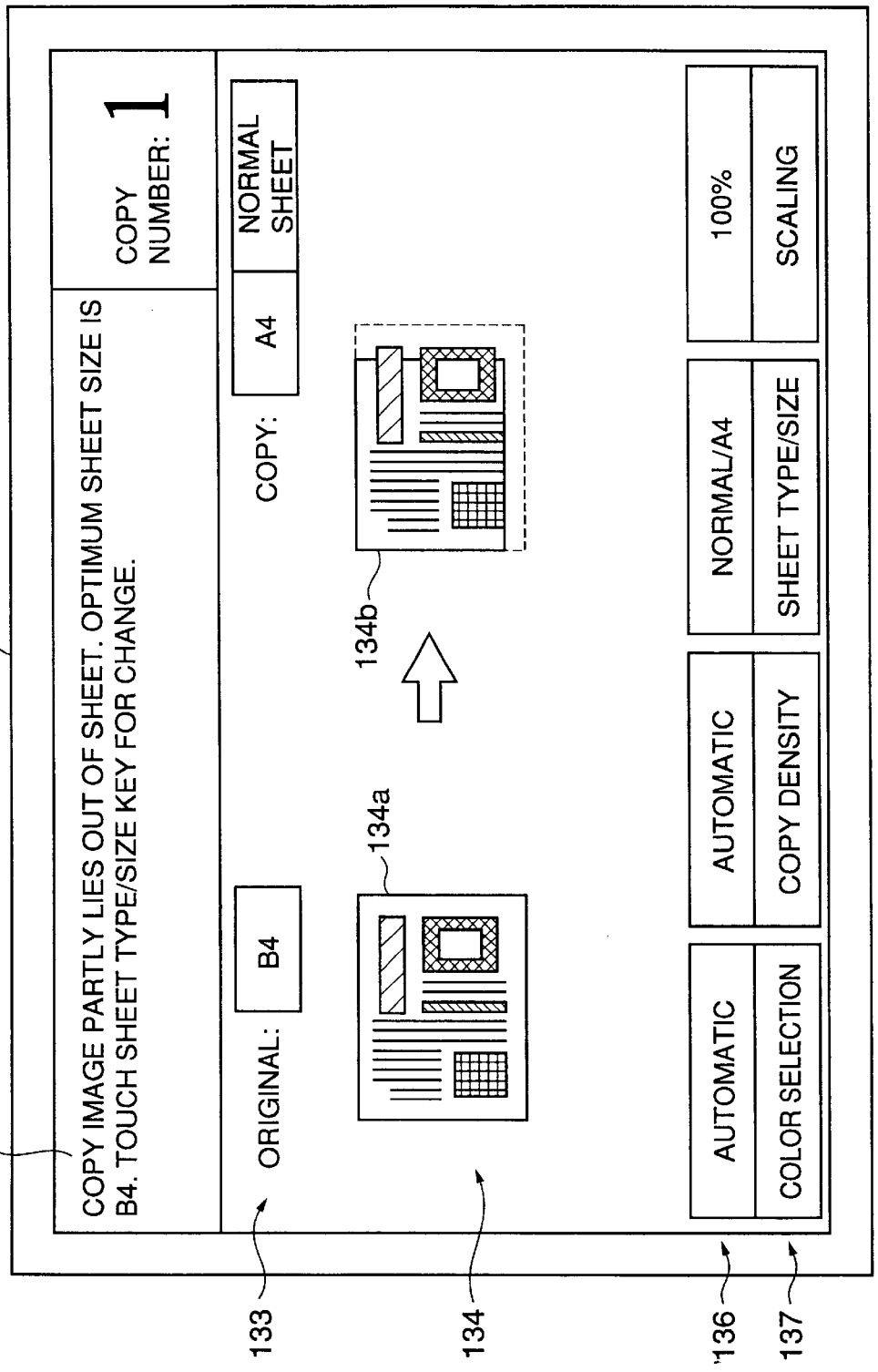
FIG. 6 is a diagram illustrating another exemplary screen to be displayed on the display after a document original is placed on the document placement portion.

FIG. 6 is a diagram illustrating another exemplary screen to be displayed on the display after a document original is placed on the document placement portion. The display screen indicates that an B4 size document original is placed on the document platen 111 or on the document tray of the ADF 112 (document placement portion). When the size (B4) of the document original placed on the document platen 111 or the document tray is sensed by the detector, the size of the document icon 134*a* to be displayed in the icon display area 134 on the display 13 and text information on the document size to be displayed in the auxiliary information display area 133 are determined on the basis of the sensed document size. Then, the document icon 134*a* having the size thus determined and the text information on the document size are displayed in the respective display areas. The document icon is displayed in an orientation which depends on the orientation of the document original placed on the document placement portion as viewed from the front size.

As described above, the copy icon 134*b* is displayed in such a state that the frame icon indicative of the sheet size is superposed on the image icon indicative of the copy image size with respect to the reference display position. In FIG. 6, the copy image size (B4) determined by multiplying the document size (B4) by the copy scaling factor (100%) is greater than the sheet size (A4), so that the copy icon 134*b* is displayed in such a state that the image icon partly lies out of the frame icon. By viewing the copy icon 134*b*, the operator instantaneously finds that the sheet size is too small for the document size and the copy scaling factor.

Since the sheet size (A4) of the default setting is too small for the copy image size (B4) determined by the sensed document size (B4) and the copy scaling factor (100%) of the default setting, a message that the copy image cannot completely be accommodated in the sheet is displayed in the message area 131 along with information on a sheet size suitable for the copy image size (B4) and an instruction for an operation to be performed for changing the setting of the sheet size. By viewing the information displayed in the message area 13 1, the operator can confirm again that the currently selected sheet size is not suitable for the document size and the copy scaling factor. Thus, creation of an unacceptable copy can be prevented which may otherwise occur when the copying operation is performed under such improper copying conditions, thereby preventing prolongation of copy work, reduction in operation efficiency of the copying machine and waste of resources.

Figure 7:
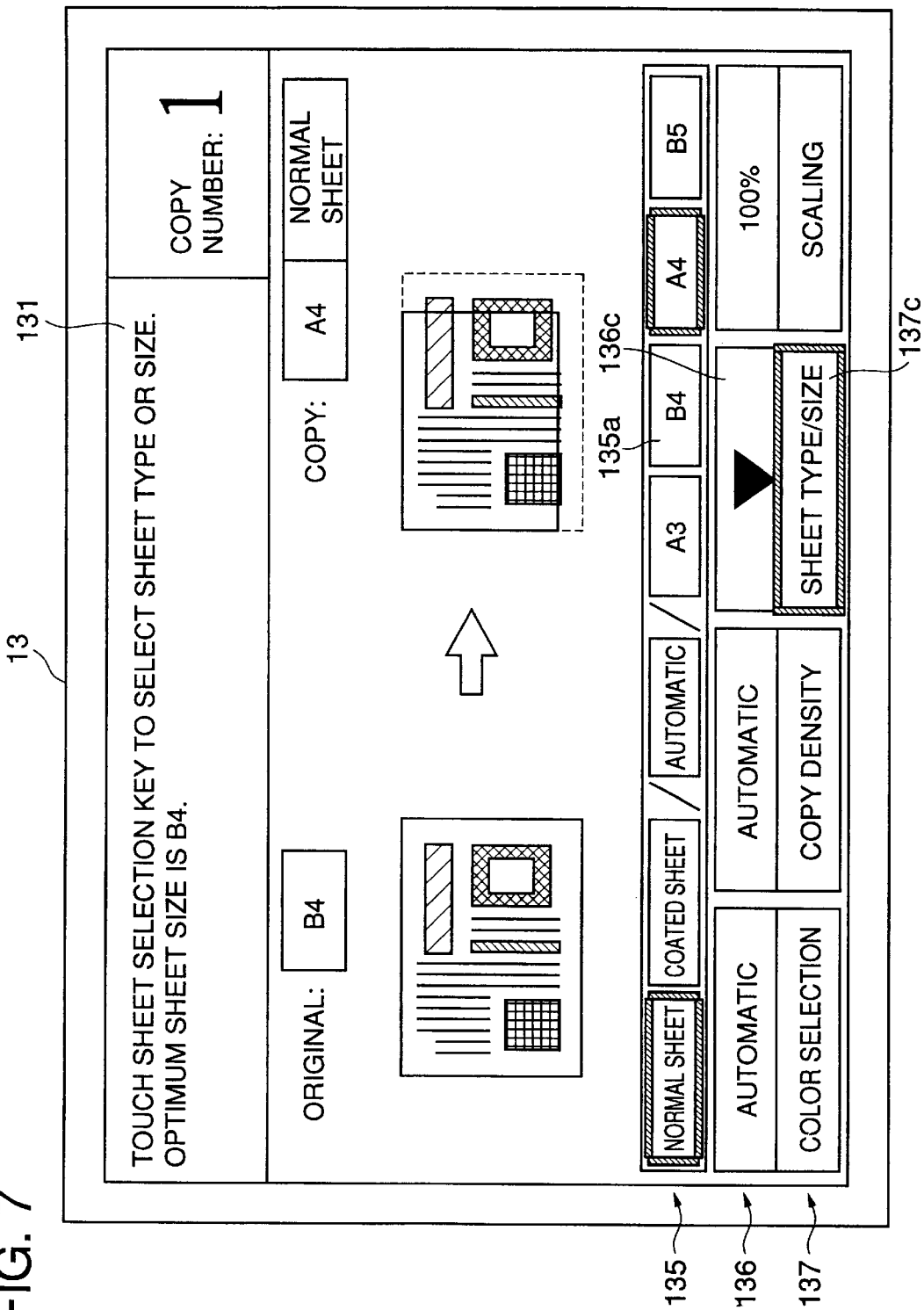
FIG. 7 is a diagram illustrating a screen to be displayed on the display when a sheet type/size setting menu is selected.

FIG. 7 is a diagram illustrating a screen to be displayed on the display when the sheet type/size setting menu is selected. When the operator operates the sheet type/size key 137*c* in the condition menu key area 137 on the screen shown in FIG. 6 for changing the setting of the sheet size, keys for the sheet types, the sheet sizes and the automatic mode which are selectable by manual operation are displayed in the condition selection area 135 provided below the icon display area 134 as shown in FIG. 7. Further, the operated sheet type/size key 137*c* is highlighted (or displayed in reverse video), and a symbol appears in a display area 136*c* associated with the sheet type/size key 137*c* to indicate the relationship between the information displayed in the condition selection area 135 and the sheet type/size key 137*c*.

Of the keys displayed in the condition selection area 135, a key indicative of the current setting is highlighted (or displayed in reverse video). Thus, the operator can easily find an improper setting which conflicts with the other copying conditions.

A message that a selecting operation is permitted for setting the sheet type/size and the B4 size is the optimum sheet size is displayed in the message area 131.

Figure 8:
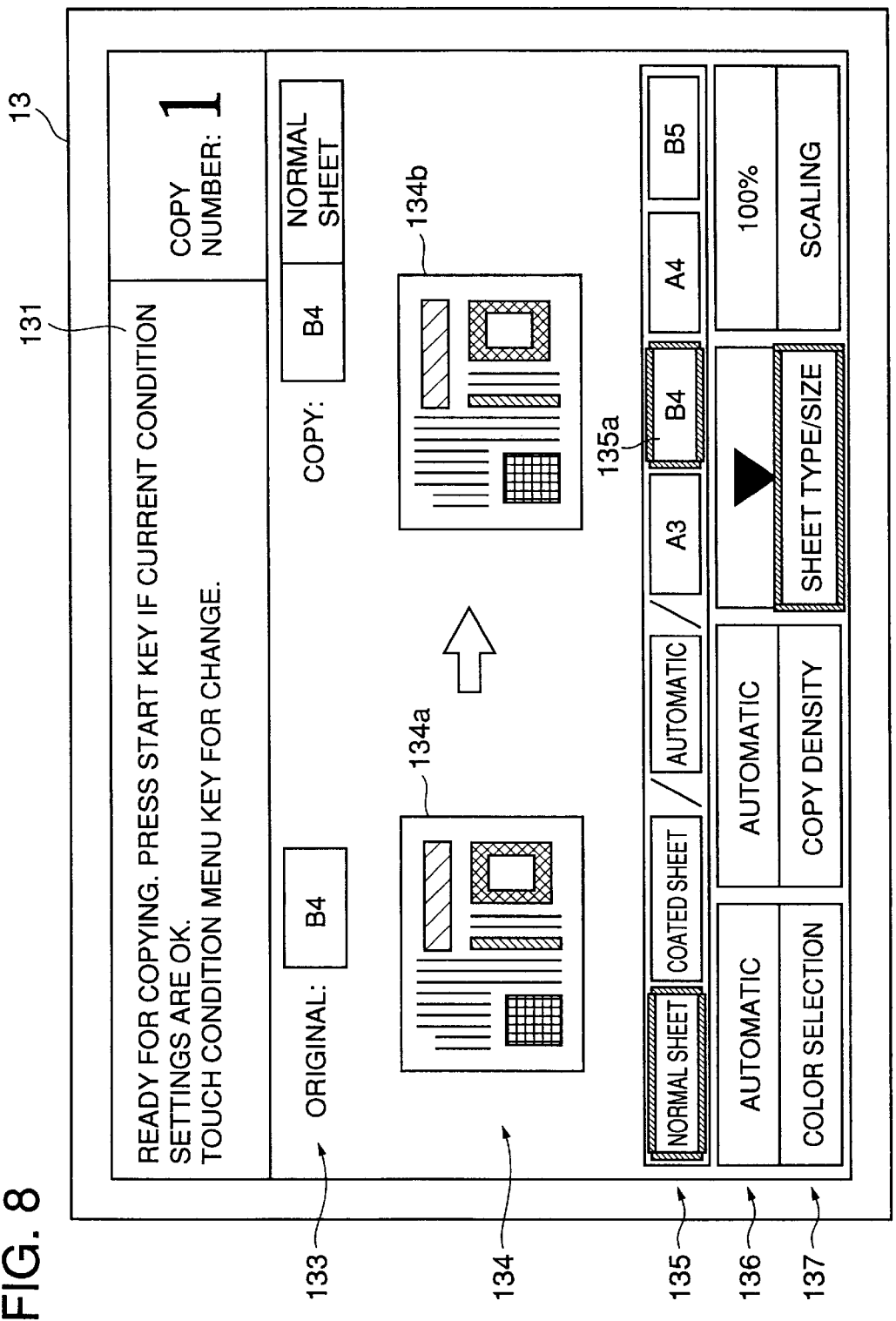
FIG. 8 is a diagram illustrating a screen to be displayed on the display when a sheet size is changed in the sheet type/size setting menu.

FIG. 8 is a diagram illustrating a screen to be displayed on the display when the sheet size is changed in the sheet type/size setting menu. When the operator operates the B4 size selection key 135*a* in the condition selection area 135 in accordance with the message displayed in the message area 131 with the screen of FIG. 7 being displayed on the display 13, the B4 size selection key 135*a* is highlighted, and the sheet size is changed from the A4 size of the former setting to the B4 size.

Then, text information "B4" for the sheet size is displayed in the auxiliary display area 133. In the icon display area 134, the copy icon 134*b* is displayed in such a state that the frame icon indicative of the sheet size is completely overlapped with the image icon indicative of the copy image size. Further, a message that the settings are proper is displayed in the message area 131.

Figure 9:
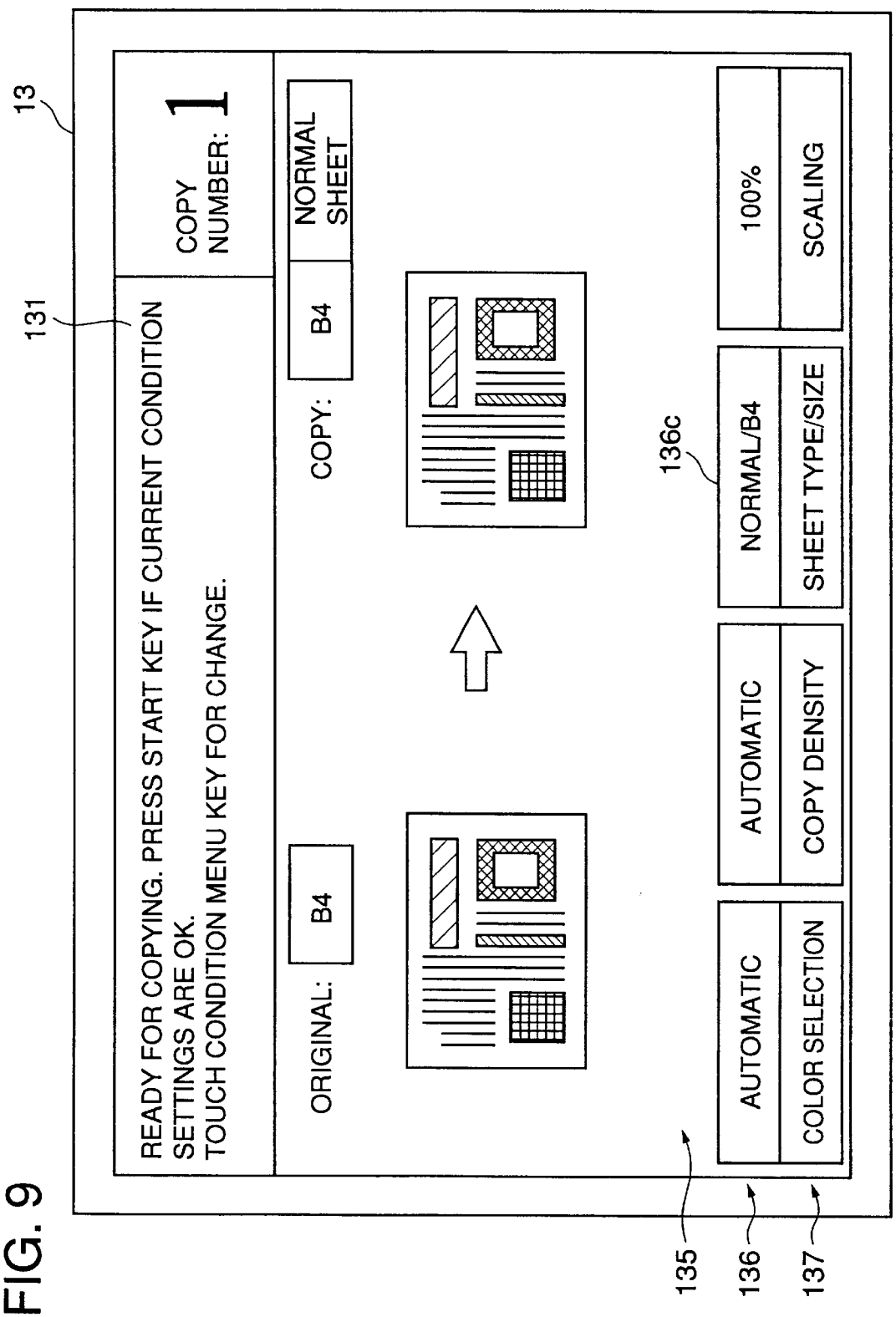
FIG. 9 is a diagram illustrating a screen to be displayed on the display for confirmation of the selected sheet size in the sheet type/size setting menu.

When any of the keys 137*a* to 137*d* in the condition menu key area 137 or the start key 16 is operated on a screen shown in FIG. 8, the setting in the sheet type/size setting menu is effected. Where the key 137*c* is operated at this time, text information of "NORMAL/B4" indicative of the setting after the change is displayed in association with the sheet type/size key in the condition display area 136 as shown in FIG. 9, and any keys are no longer displayed in the condition selection area 135.

When any of the keys in the condition menu key area 137 other than the key 137*c* is operated on the screen shown in FIG. 8, the text information of "NORMAL/B4" is displayed in association with the sheet type/size key in the condition display area 136, and options for a condition setting menu assigned to the operated key in the condition menu key area 137 are displayed in the condition selection area 135.

When the start key 16 is operated on the screen shown in FIG. 8, the text information of "NORMAL/B4" is displayed in association with the sheet type/size key in the condition display area 136, and then the copying operation is started.

Thus, the operator can easily change the settings of the copying conditions as desired on the basis of the information displayed on the display 13, and easily obtain a copy image in a desired state.

Figure 10:
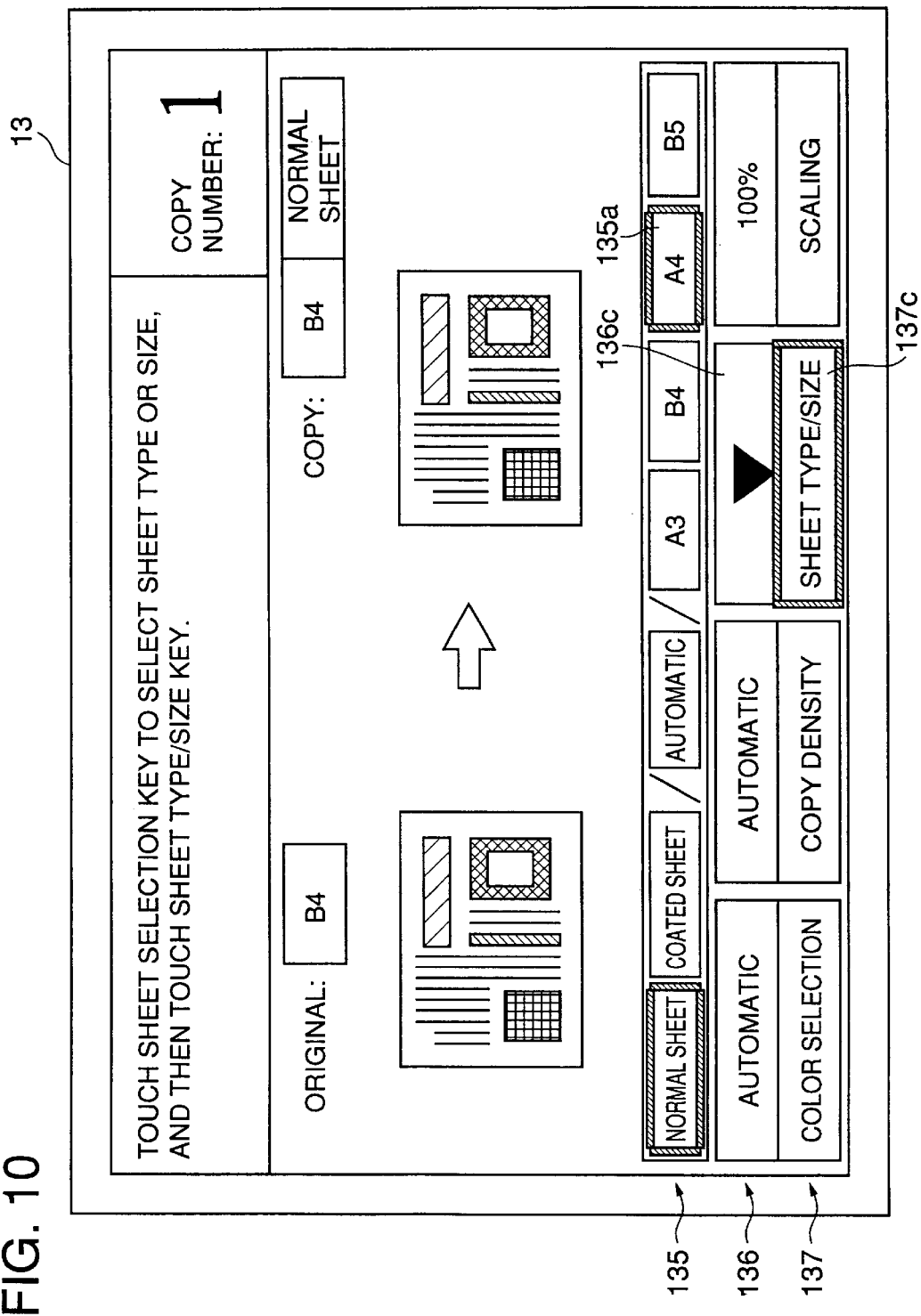
FIG. 10 is a diagram illustrating another screen to be displayed on the display when the sheet type/size setting menu is selected.

FIG. 10 is a diagram illustrating another screen to be displayed on the display when the sheet type/size setting menu is selected. When the operator operates the sheet type/size key 137c on the screen shown in FIG. 5, the sheet type/size key 137c is highlighted, and the plurality of selection keys are displayed in the condition selection area 135, and the predetermined symbol is displayed in the display area 136c of the condition display area 136. The display state in the areas 135 to 137 is the same as in FIG. 7.

Figure 11:
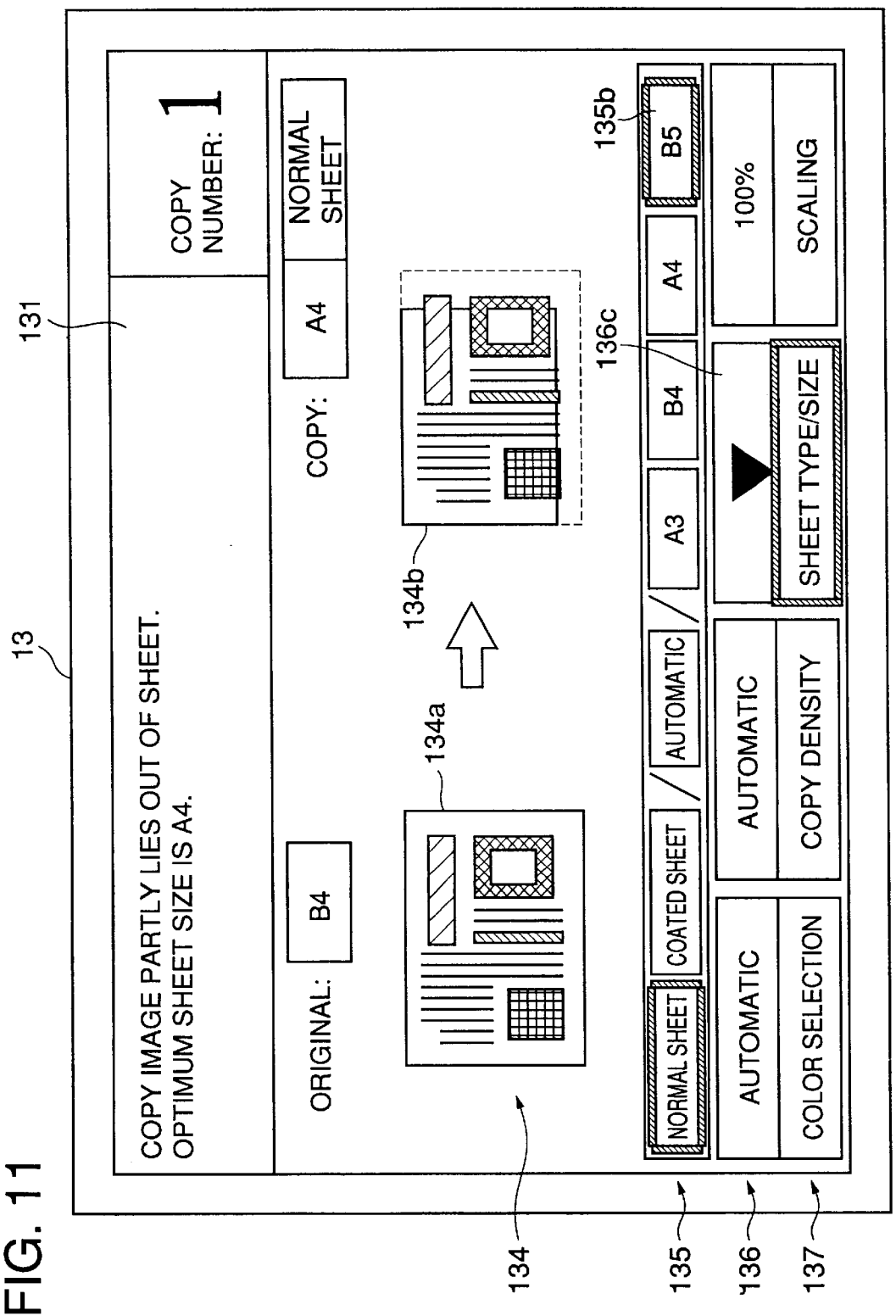
FIG. 11 is a diagram illustrating a screen to be displayed on the display when a sheet size not suitable for a copy image size is selected in the sheet type/size setting menu.

When the operator operates a B5 size selection key 135b displayed in the condition selection area 135, the B5 size selection key 135b is highlighted, and the copy icon 134b is displayed in the icon display area 134 in such a state that a frame icon representing a B5-size sheet is superposed on an image icon representing an A4-size copy image with respect to the reference display position as shown in FIG. 11. Therefore, the displayed copy icon 134b is such that the image icon for the copy image size partly lies out of the frame icon for the sheet size. If the image forming operation is performed with the use of the B5-size sheet selected by the operator, there is a possibility that the original image is formed on the sheet with a part thereof missing. To eliminate such a possibility, a message that the copy image will partly lie out of the sheet is displayed in the message area 131.

Where the copying condition set by the operator is inconsistent with the other copying conditions, information on the inconsistency in the copying conditions is displayed in the icon display area 134 and in the message area 131. Thus, the operator can quickly and intuitively realize on the basis of the information displayed in the icon display area 134 and confirm on the basis of the message displayed in the message area 131 that the copying condition thus set is improper. Therefore, creation of an unacceptable copy can be prevented which may otherwise result in reduction in operation efficiency and waste of resources.

Figure 12:
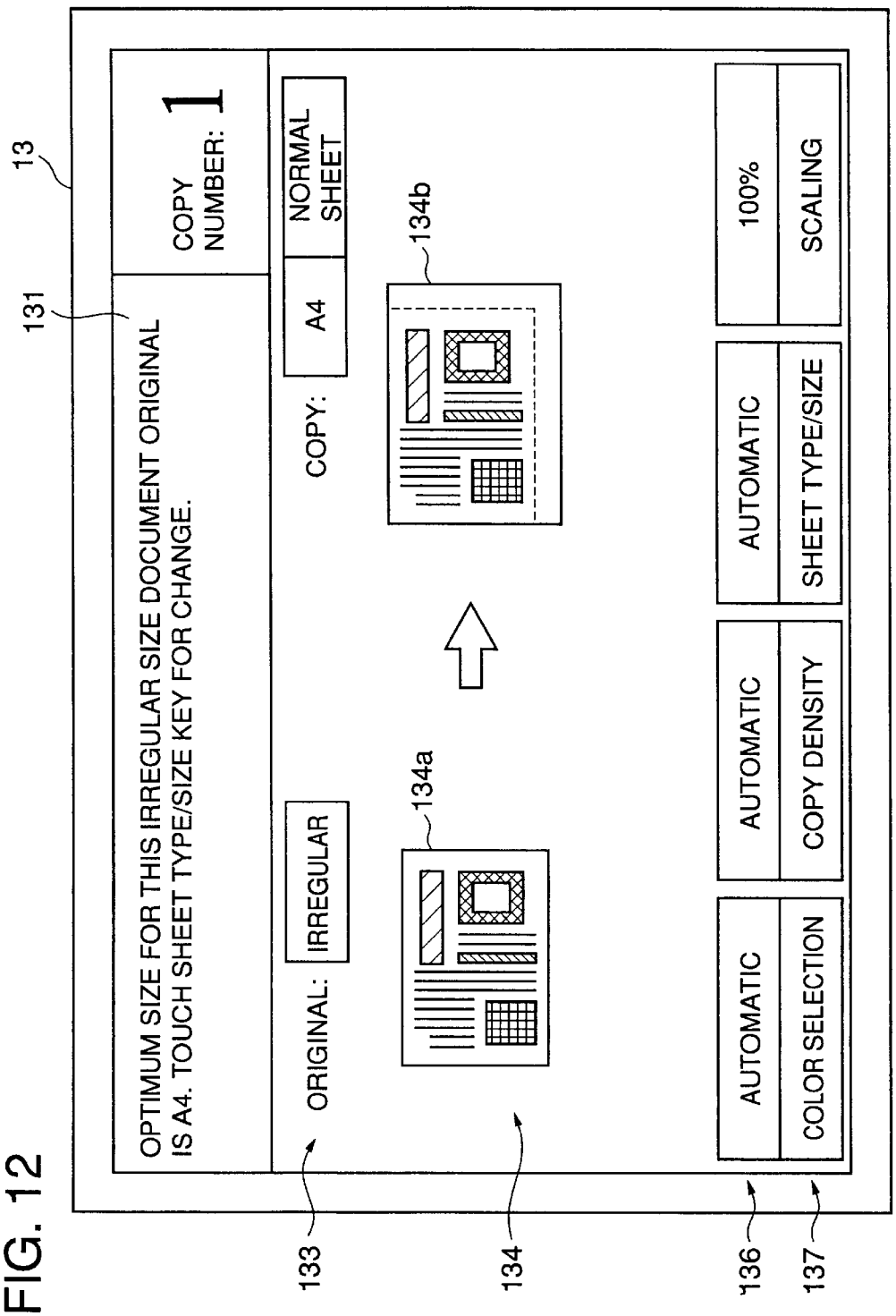
FIG. 12 is a diagram illustrating a screen to be displayed on the display when an irregular size document original is detected on the document placement portion.

FIG. 12 is a diagram illustrating a screen to be displayed on the display when an irregular-size document original is detected on the document placement portion. Where the document size sensed on the document platen 111 or the document tray (document placement portion) is an irregular size intermediate the A4size and the B5size, text information of "IRREGULAR" is displayed in a document size display area of the auxiliary information display area 133. The document icon 134a is displayed in a size corresponding to the sensed document size, i.e., the irregular size intermediate the A4 size and the B5 size, in the icon display area 134.

In the icon display area 134, the copy icon 134b is displayed in such a state that a frame icon having a size corresponding to the preset sheet size (A4) is superposed on an image icon having a size corresponding to a copy image size determined by multiplying the sensed document size by the copy scaling factor (100%) with respect to the reference display position. Further, a message that the optimum sheet size is a regular size of A4 which is at least greater than the sensed irregular size is displayed in the message area 131.

Even if the document size sensed on the document placement portion is an irregular size, the operator can quickly confirm that the current setting of the sheet size is proper by viewing the copy icon 134b displayed in the icon display area 134. By viewing the message displayed in the message area 131 and the auxiliary information displayed in the auxiliary information display area 133, the operator can confirm again that the current setting of the sheet size is the optimum for the irregular size document.

Figure 13:
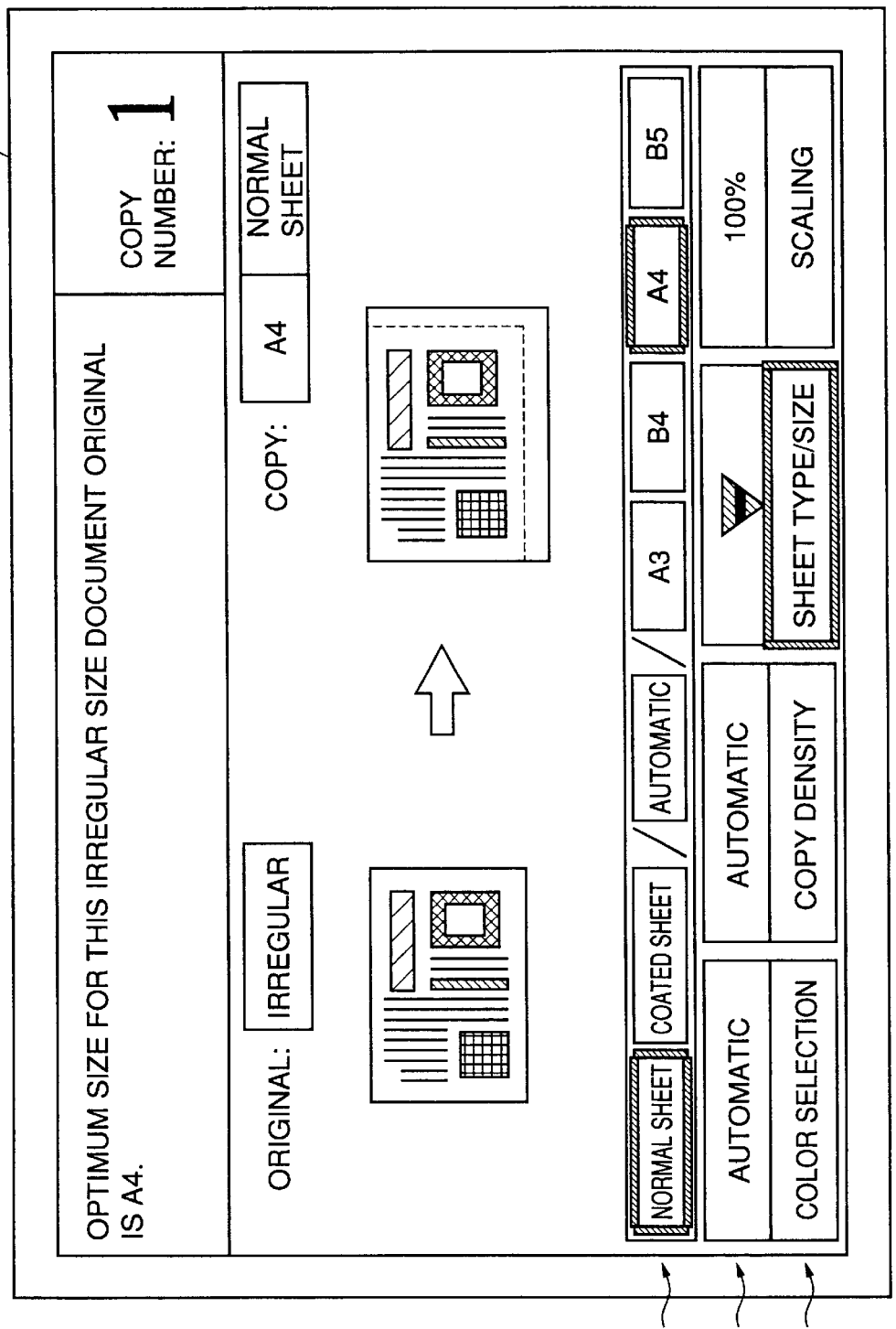
FIG. 13 is a diagram illustrating a screen to be displayed on the display when the sheet type/size setting menu is selected at the detection of the irregular-size document original on the document placement portion.

When the sheet type/size setting menu is selected by operating the key 137c displayed in the condition menu key area 137 on the screen shown in FIG. 12, the sheet type/size key 137c is highlighted, and the plurality of selection keys are displayed in the condition selection area 135 as shown in FIG. 13. Further, the predetermined symbol is displayed in the display area 136c of the condition display area 136. The display state in the areas 135 to 137 is the same as in FIG. 7.

Figure 14:
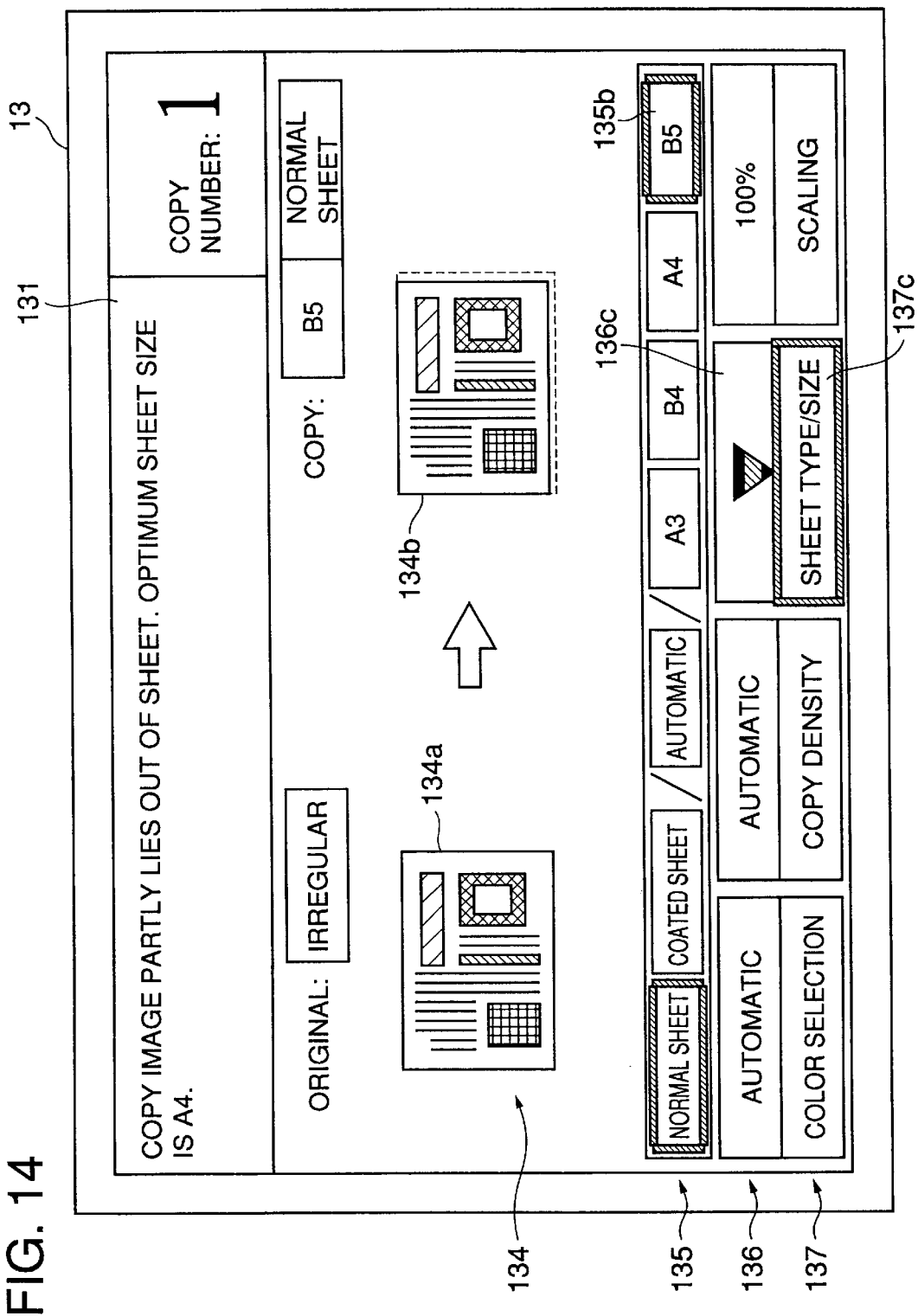
FIG. 14 is a diagram illustrating an exemplary screen to be displayed on the display when a sheet size not suitable for a copy image size is selected in the sheet type/size setting menu at the detection of the irregular-size document original on the document placement portion.

When the operator operates the B5 size selection key 135b displayed in the condition selection area 135, the B5 size selection key 135b is highlighted, and the copy icon 134b is displayed in the icon display area 134 in such a state that a frame icon representing a B5-size sheet is superimposed on an image icon representing a copy image having the irregular size greater than the A4 size with respect to the reference display position as shown in FIG. 14. Therefore, the displayed copy icon 134b is such that the image icon having a size corresponding to the copy image size partly lies out of the frame icon having a size corresponding to the sheet size. If the image forming operation is performed with the use of the B5-size sheet selected by the operator, there is a possibility that the original image is formed on the sheet with a part thereof missing. Therefore, a message that the image will partly lie out of the sheet is displayed in the message area 131.

Where the copying condition set by the operator is inconsistent with the other copying conditions, information on the inconsistency in the copying conditions is displayed in the icon display area 134 and in the message area 131. Thus, the operator can quickly and intuitively realize on the basis of the information displayed in the icon display area 134 and confirm on the basis of the message displayed in the message area 131 that the copying condition thus set is improper. Therefore, creation of an unacceptable copy can be prevented which may otherwise result in reduction in operation efficiency and waste of resources.

Figure 15:
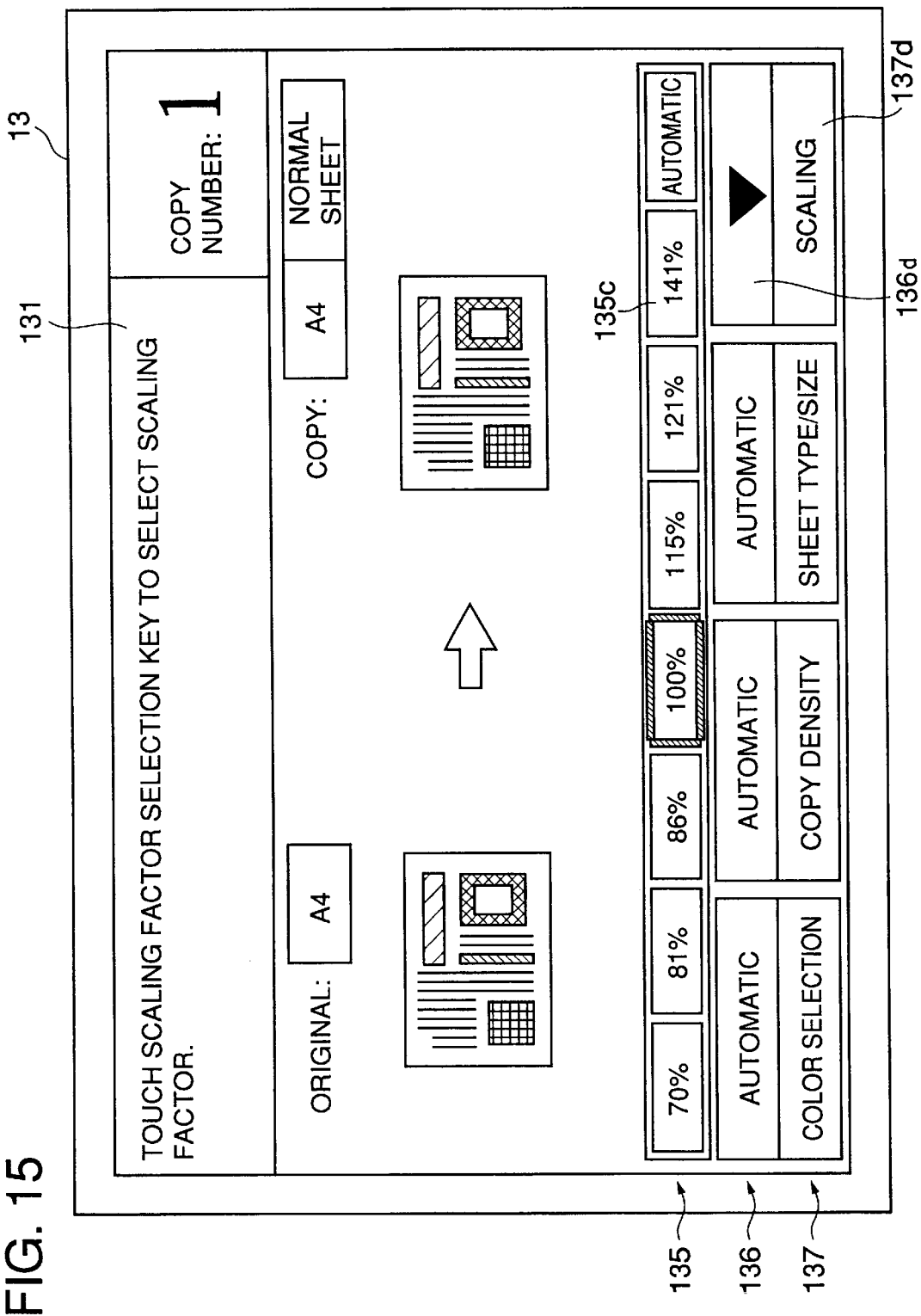
FIG. 15 is a diagram illustrating a screen to be displayed on the display when a copy scaling factor setting menu is selected.

FIG. 15 is a diagram illustrating a screen to be displayed on the display when a copy scaling factor setting menu is selected. When the scaling key 137d is operated on the screen shown in FIG. 5, keys for the plurality of preset scaling factors and the automatic mode are displayed as options for the copy scaling factor setting menu in the condition selection area 135 below the icon display area 134 as shown in FIG. 15. Further, the operated scaling key 137d is highlighted (or displayed in reverse video), and the symbol appears in a display area 136d associated with the scaling key 137d to indicate the relationship between the information displayed in the condition selection area 135 and the scaling key 137d.

Of the keys displayed in the condition selection area 135, a key indicative of the current setting is highlighted (or displayed in reverse video). Thus, the operator can easily find an improper setting which conflicts with the other copying conditions.

A message that a selecting operation is permitted for setting the scaling factor is displayed in the message area 131.

Figure 16:
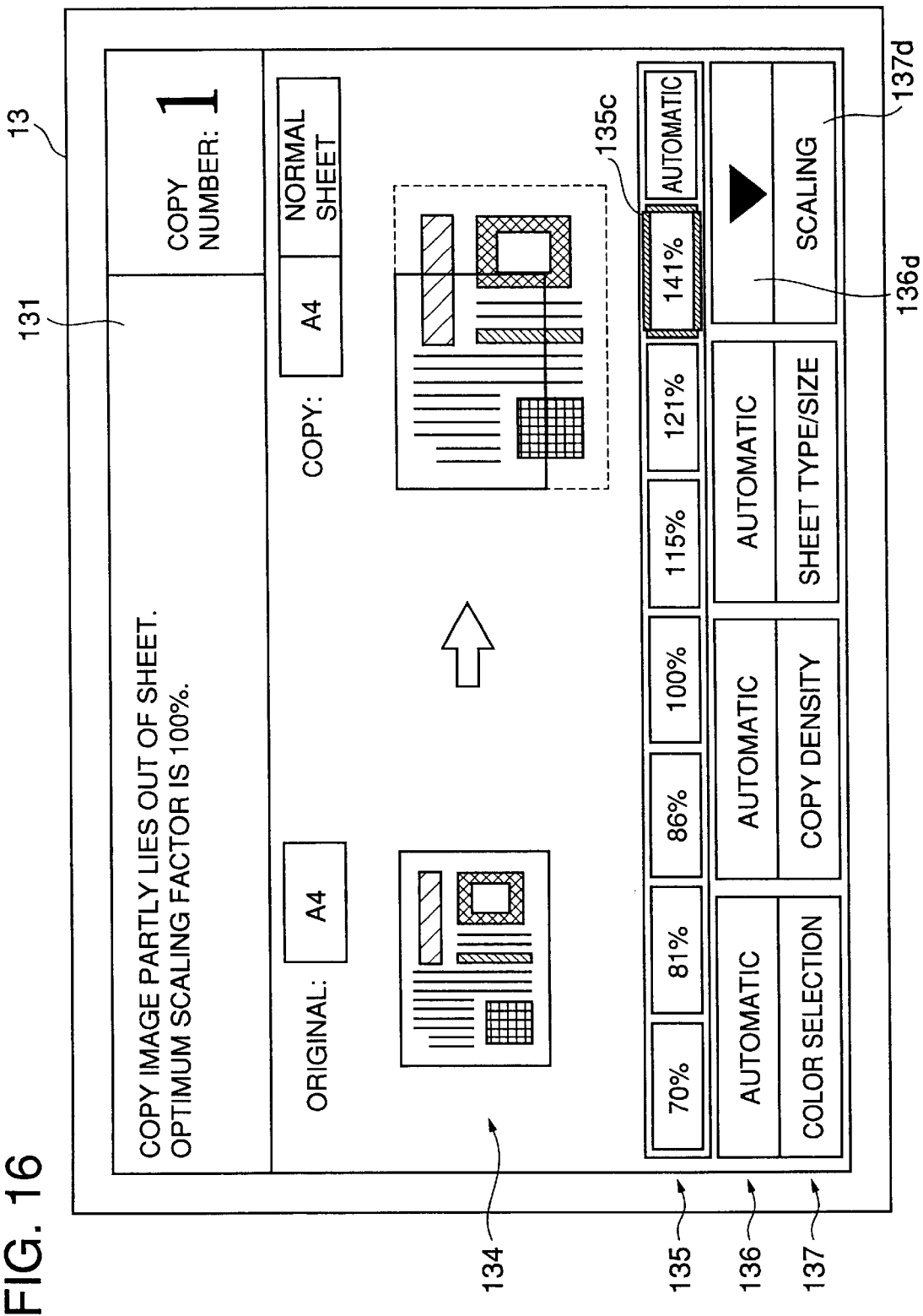
FIG. 16 is a diagram illustrating a screen to be displayed on the display when an improper copy scaling factor is selected in the copy scaling factor setting menu.

When the operator operates a 141% key 135c displayed in the condition selection area 135 on the screen shown in FIG. 15, the screen displayed on the display 13 is changed as shown in FIG. 16. More specifically, the operated key 135c is highlighted, and the copy icon 134b is displayed in the icon display area 134 in such a state that a frame icon having a size corresponding to the preset sheet size (A4) is superposed on an image icon representing a copy image obtained by enlarging the original image (A4) by a scaling factor of 141% with respect to the reference display position.

Therefore, the displayed copy icon 134b indicates that the A3-size copy image indicated by a broken line partly lies out of the A4-size sheet indicated by a solid line. Further, a message that the enlarged copy image will partly lie out of the sheet is displayed along with the optimum copy scaling factor in the message area 131.

Where the copy scaling factor thus set by the operator is inconsistent with the other copying conditions and there is a possibility that the copy image will partly lie out of the sheet as a result of the image forming operation performed by employing the copy scaling factor, the operator can quickly find, by viewing the copy icon 134b displayed in the icon display area 134, that the setting of the copy scaling factor is improper. By viewing the information displayed in the message area 131, the operator can confirm again that the copy scaling factor is improper, and can know the optimum copy scaling factor. Thus, creation of an unacceptable copy can be prevented which may otherwise result in reduction in operation efficiency and waste of resources.

It is noted that the keys displayed in the condition selection area 135 may include a key for selectively setting the plurality of conditions. Where a so-called zooming function is provided for setting the copy scaling factor in 1% increments, for example, an up/down key for setting the copy scaling factor in 1% increments may be displayed in the condition selection area 135.

Figure 17:
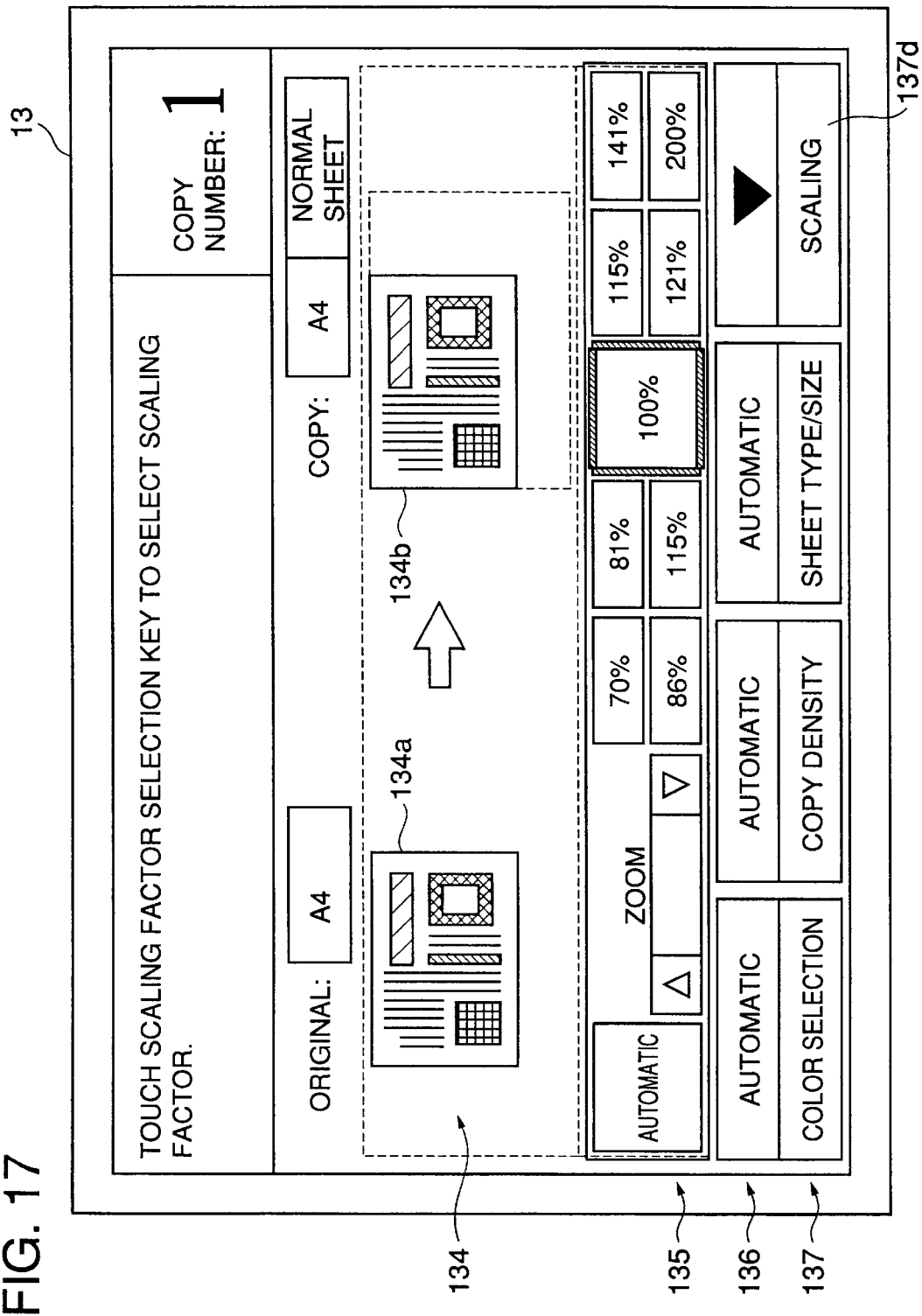
FIG. 17 is a diagram illustrating a screen to be displayed on a display of an apparatus for setting image forming conditions in accordance with a second embodiment of the invention.

FIG. 17 is a diagram illustrating a screen to be displayed on a display of an apparatus for setting image forming conditions in accordance with a second embodiment of the invention. In this embodiment, the display 13 is adapted to display the icons in variable display positions in the icon display area 134 depending on the total number of keys to be displayed in the condition selection area 135. For improvement in legibility of the icons on the display 13, the display sizes of the icons are preferably as great as possible, so that the other areas including the condition selection area 135 are liable to become smaller.

Some of the condition setting menus have a multiplicity of options to be selected by operating keys displayed in the condition selection area 135. If the keys for the multiplicity of options for such a condition setting menu are simultaneously displayed in the relatively small condition selection area 135, the keys will each have a smaller display size, so that the operability will be deteriorated. On the contrary, if a limited number of keys are displayed at a time and the other keys are displayed by scrolling, it will be necessary to search for a key for a desired copy condition by scrolling over the condition selection area 135 for setting the copy condition. This will prevent quick setting of the copy conditions.

In this respect, where it is necessary to provide a multiplicity of condition keys for a condition setting menu selected by operating the condition menu key area 137, the document icon 134a and the copy icon 134b are temporarily shifted upward within the icon display area 134 located above the condition setting area 135 to expand the condition selection area 135. Thus, the multiplicity of condition keys can simultaneously be displayed in a size large enough to ensure easy operation thereof within the condition selection area 135. This ensures easy and correct operation for the condition setting when the copy condition setting menu having a multiplicity of key-in options is selected.

Referring to FIG. 17, where options for the copy scaling factor setting menu include nine preset scaling factors, an automatic setting mode and a zooming mode, for example, the document icon 134a and the copy icon 134b are shifted upward in the icon display area 134 upon operation of the scaling key 137d for selection of the copy scaling factor setting menu. Thus, a space between the icon display area 134 and the condition display area 136 located therebelow is expanded in which the condition selection area 135 is located, and nine scaling factor keys for the nine preset scaling factors, an automatic key for the automatic setting mode and an up/down key for the zooming mode are simultaneously displayed in the condition selection area 135.

Although the display is adapted to shift the icons upward in the icon display area 134 in accordance with the total number of condition keys to be displayed in the condition selection area 135 as shown in FIG. 17, the display may be adapted to display the icons in variable display sizes in the icon display area 134. More specifically, where a condition setting menu is selected for which a multiplicity of condition keys are to be displayed in the condition selection area 135, the condition selection area 135 located below the icon display area 134 is expanded by displaying the icons in smaller sizes in the icon display area 134, whereby the multiplicity of condition keys can simultaneously be displayed without reduction in operability.

Figure 18:
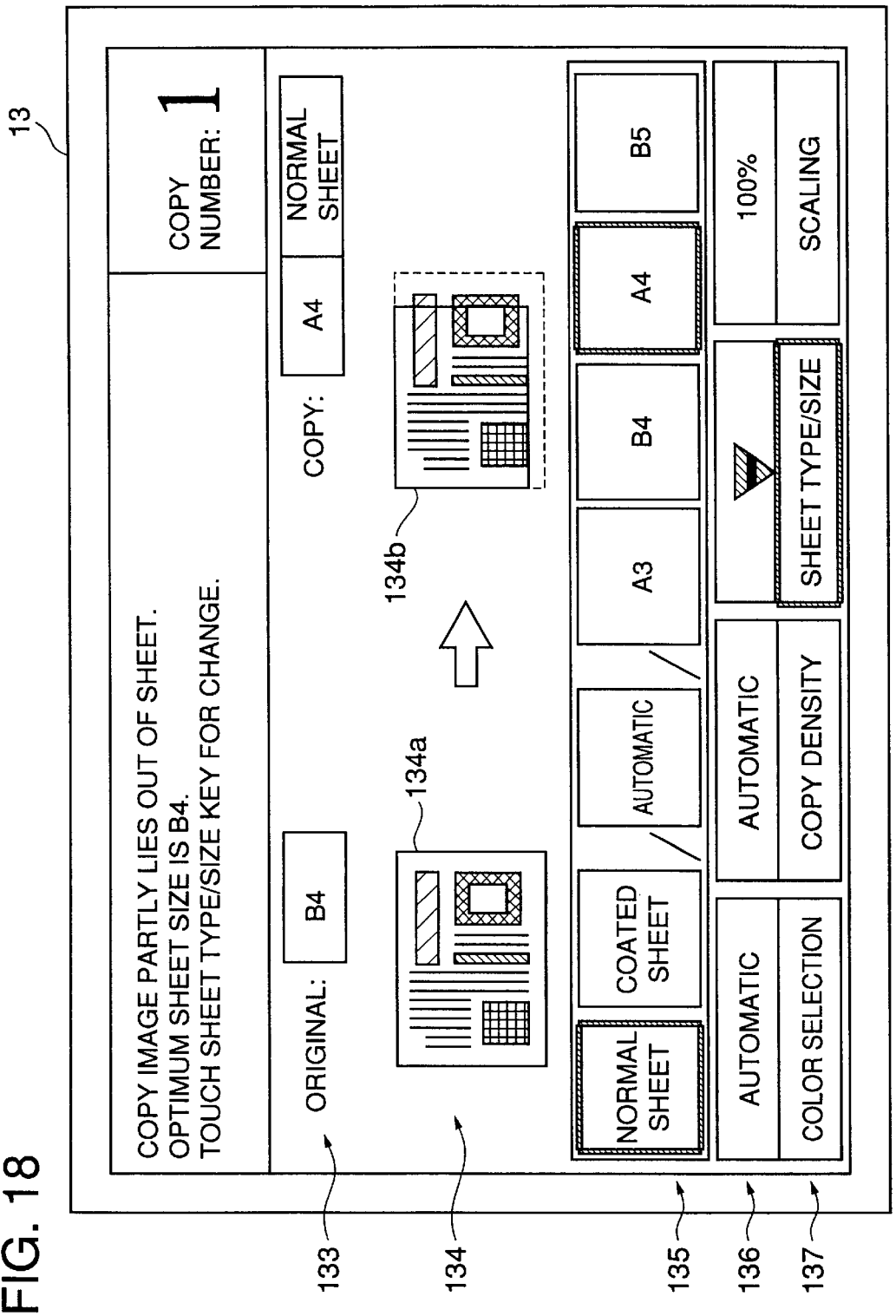
FIG. 18 is a diagram illustrating a screen to be displayed on a display of an apparatus for setting image forming conditions in accordance with a third embodiment of the invention.

FIG. 18 is a diagram illustrating a screen to be displayed on a display of an apparatus for setting image forming conditions in accordance with a third embodiment of the invention. Although the apparatuses according to the first and second embodiments are each adapted to display the document icon 134a and the copy icon 134b in any of the nine display sizes in accordance with the size (regular or irregular size) of the sheet in the icon display area 134, the apparatus according to this embodiment is adapted to display the document icon and the copy icon in the icon display area 134 to show only a dimensional relation between a copy image and a sheet.

More specifically, text information on the document size and the sheet size is displayed in the auxiliary information display area 133 located above the icon display area 134 on the display screen of the display 13. Therefore, the operator can easily realize the document size and the sheet size by viewing the information displayed in the auxiliary information display area 133. For the purpose of quick preview of an image formation state, it is only necessary to show whether or not the sheet size is suitable for the copy image size by displaying the icons in the icon display area 134. Therefore, it is less necessary to allow the operator to find the document size and the sheet size from the icons displayed in the icon display area 134.

In FIG. 18, text information on the document size and the sheet size is displayed in the auxiliary information display area 133, and the copy icon 134b displayed in the icon display area 134 shows a dimensional relationship between the copy image and the sheet, i.e., a state where the copy image size matches with the sheet size, a state where the copy image is greater than the sheet, or a state where the copy image is smaller than the sheet, on the basis of a comparison between the copy image size and the sheet size irrespective of the actual sizes of the copy image and the sheet.

This eliminates the need for changing the sizes of the document icon 134a and the copy icon 134b displayed in the icon display area 134 in accordance with the actual sizes of the document original and the sheet, so that the size of the icon display area 134 can be reduced with respect to the size of the screen of display 13 to correspondingly expand the condition selection area 135. Thus, the multiplicity of condition keys can simultaneously be displayed without deterioration of the operability thereof.

This eliminates the need for changing the sizes of the document icon 134a and the copy icon 134b displayed in the icon display area 13 in accordance with the actual sizes of the document original and the sheet, so that the size of the icon display area 134 can be reduced with respect to the size of the screen of the display 13 to correspondingly expand the condition selection area 135. Thus, the multiplicity of condition keys can simultaneously be displayed without deterioration of the operability thereof.

Figure 19:
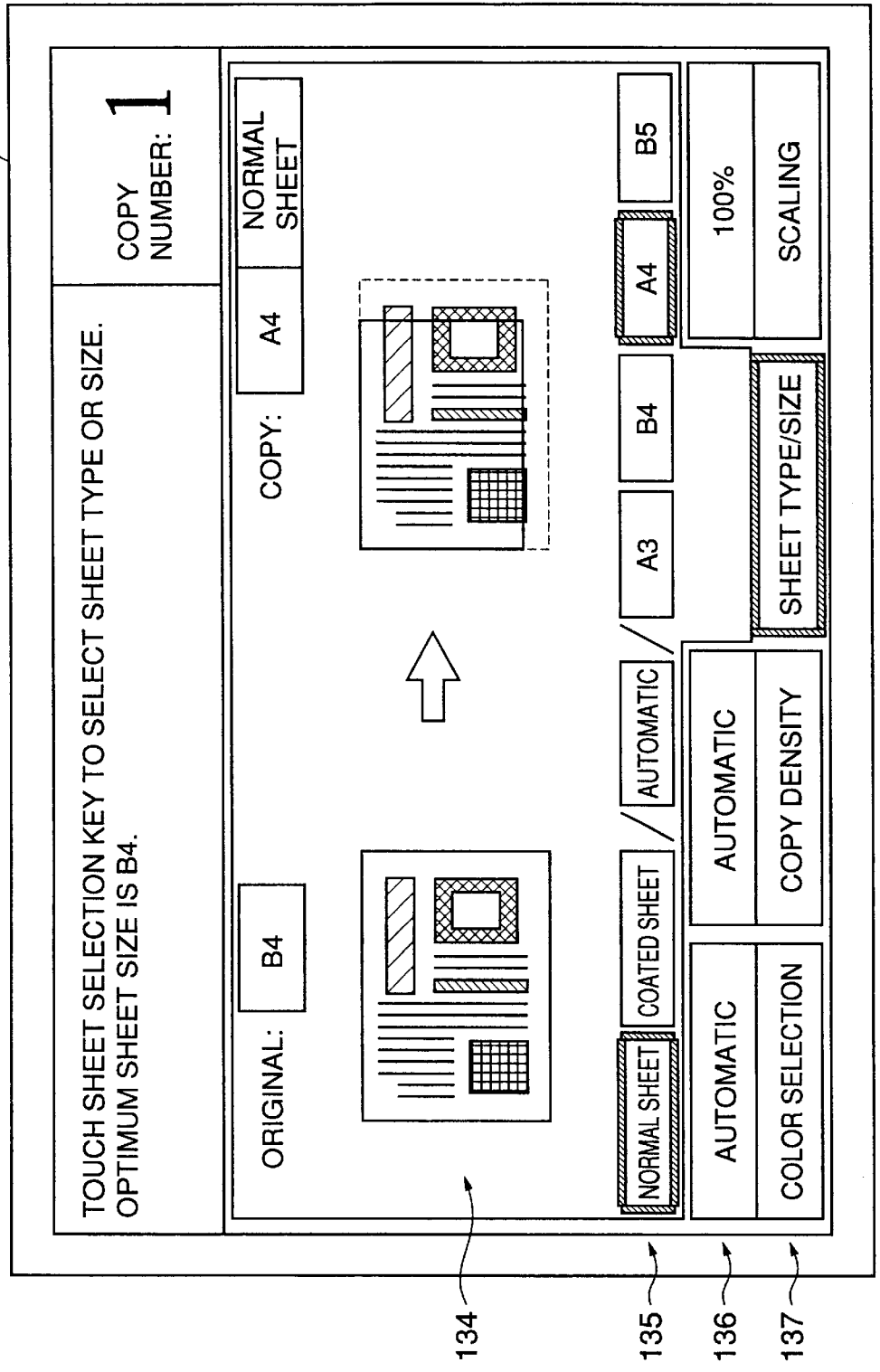
FIG. 19 is a diagram illustrating a first exemplary screen to be displayed on the display in the third embodiment when an image forming condition is to be set.
Figure 20:
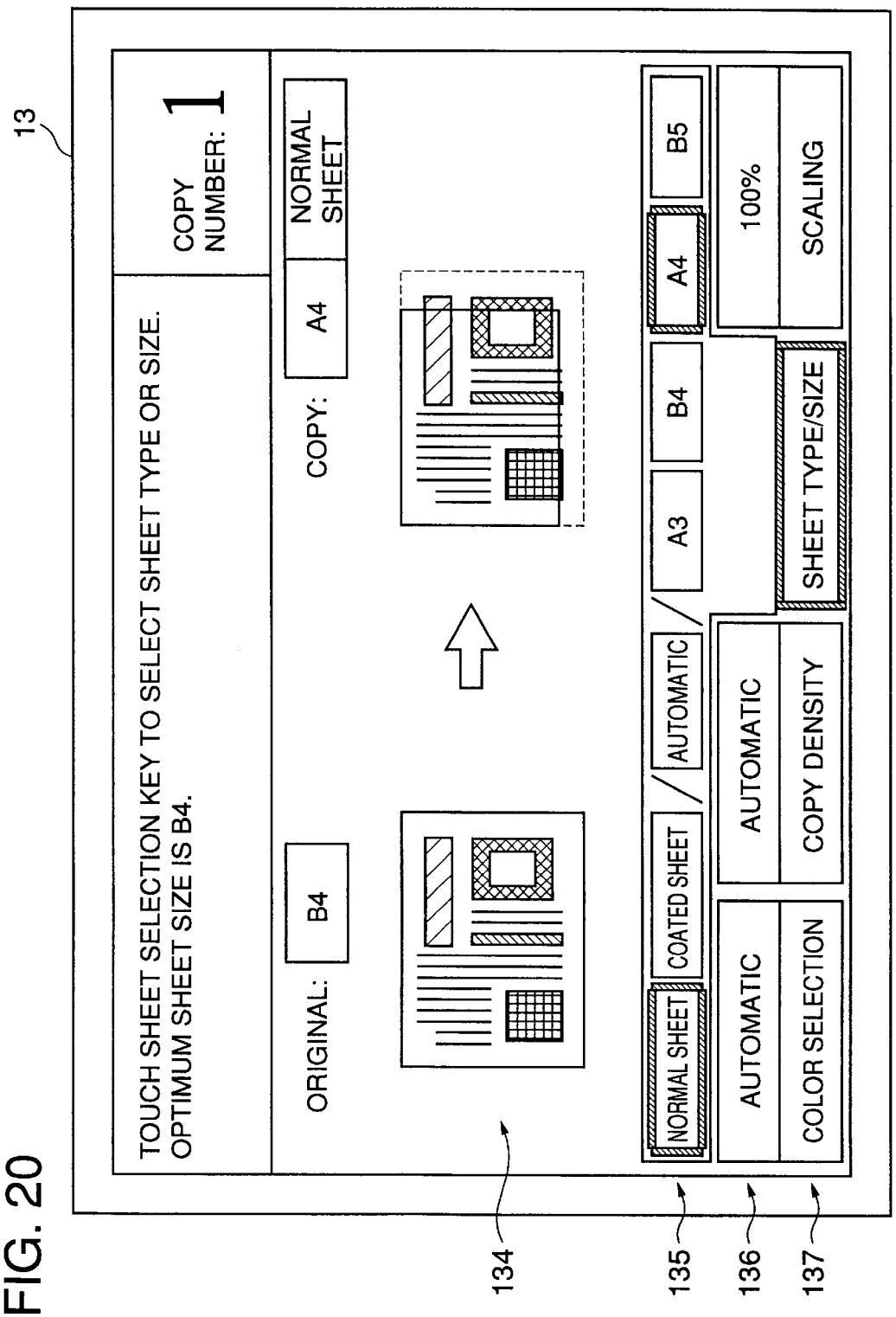
FIG. 20 is a diagram illustrating a second exemplary screen to be displayed on the display in the third embodiment when an image forming condition is to be set.
Figure 21:
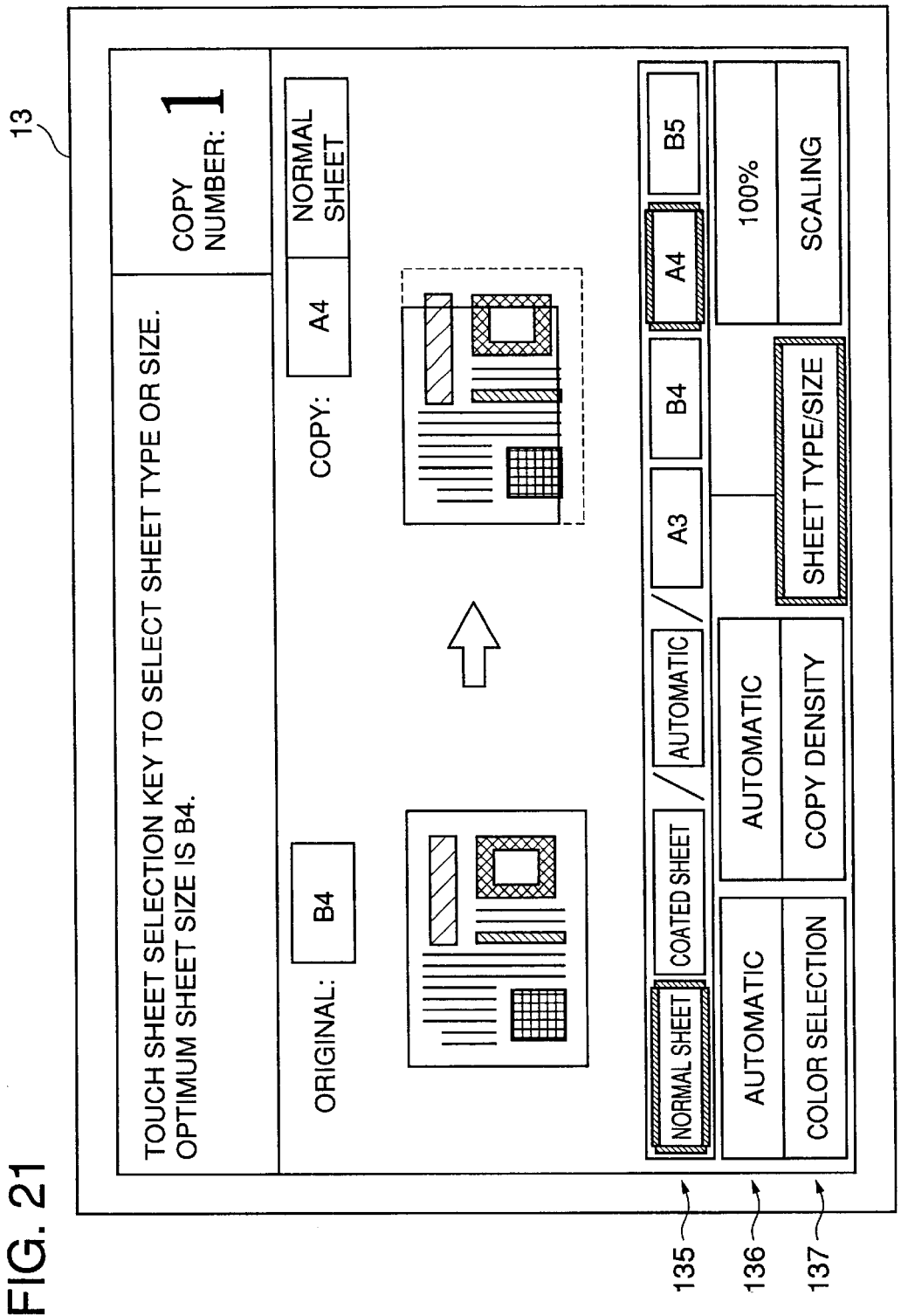
FIG. 21 is a diagram illustrating a third exemplary screen to be displayed on the display device in the third embodiment when an image forming condition is to be set.

As shown in FIG. 19, the condition setting apparatus may be designed so that, when any of the keys in the condition menu key area 137 is operated, a corresponding display area in the condition display area 136 is cleared, and the key operated in the condition menu key area 137 as well as the condition selection area 135 and the icon display area 134 are displayed in unison to show the relationship between the key operated in the condition menu key area 137 and the information displayed in the condition selection areas 135 with little visual complexity. Alternatively, the key operated in the condition menu key area 137 and the condition selection area 135 may be displayed in unison. Further, a line may be displayed for linking the condition selection area 135 to the key operated in the condition menu key area 137.

Figure 22:
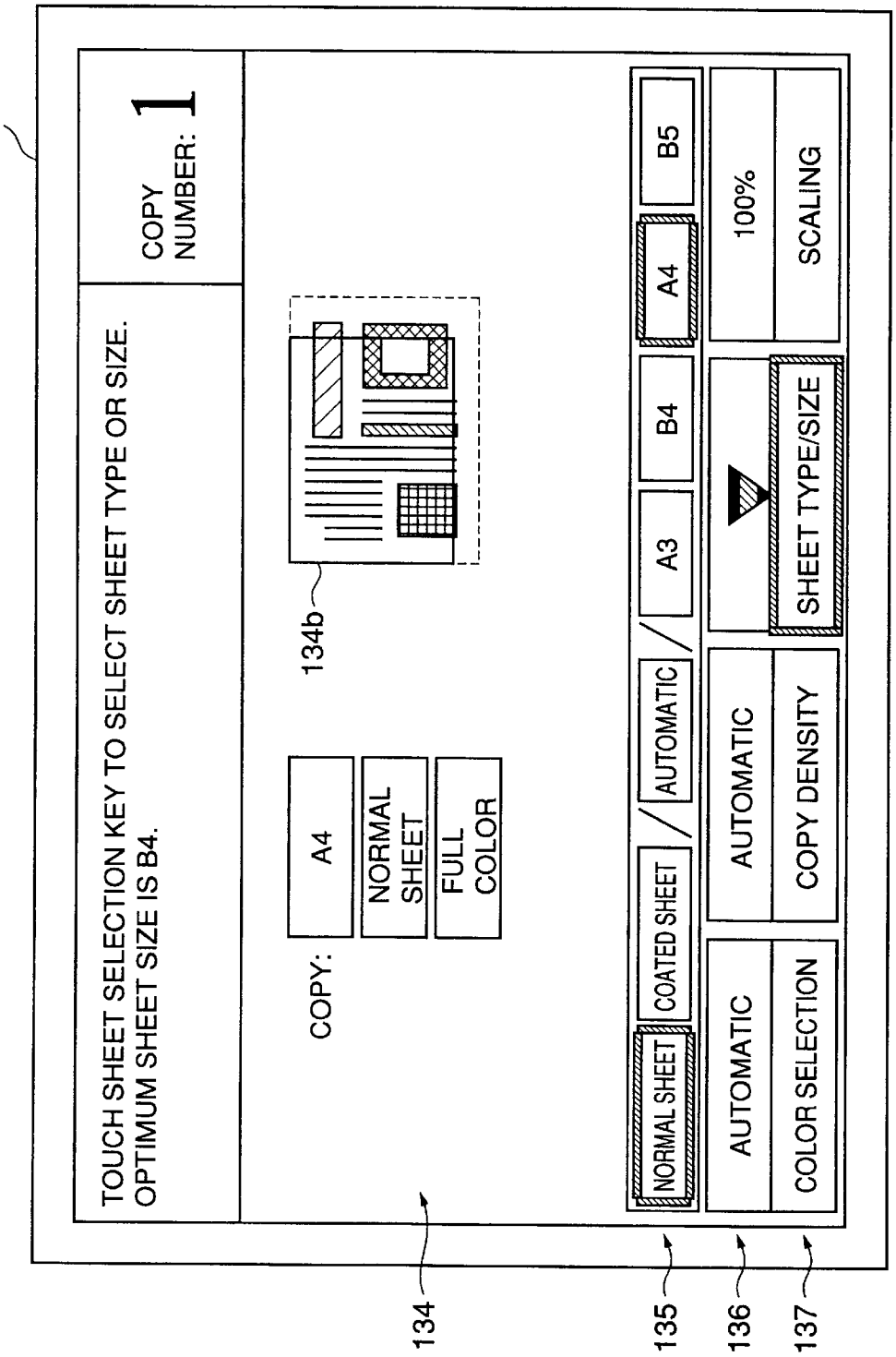
FIG. 22 is a diagram illustrating a fourth exemplary screen to be displayed on the display in the fourth embodiment when an image forming condition is to be set.

As shown in FIG. 22, only the auxiliary information on the sheet and the copy icon 134b may be displayed in the auxiliary information display area 133 and in the icon display area 134, respectively, so that the auxiliary information display area 133 and the icon display area 134 occupy a smaller proportion of the screen of the display 13 to correspondingly expand the condition selection area 135. Thus, the multiplicity of condition keys can simultaneously be displayed in the condition selection area 135 without deterioration of the operability thereof.

Figure 23:
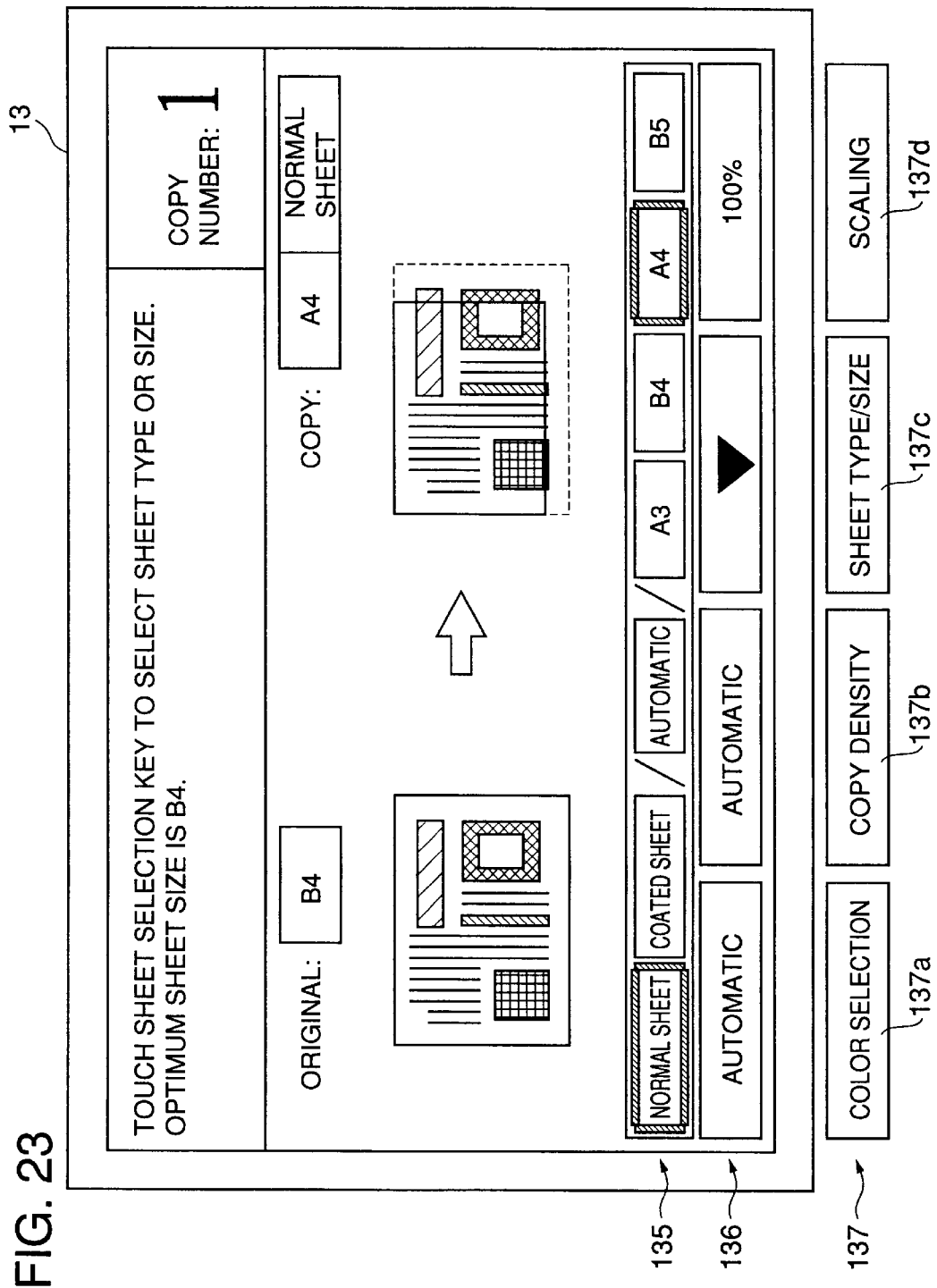
FIG. 23 is a diagram illustrating a modification of the display in the third embodiment.

As shown in FIG. 23, the keys 137a to 137d may be provided not in the condition menu key area 137 but outside the display 13 on the operation panel 11 as key switches. With this arrangement, the area on the screen of the display 13 is freed up, so that the condition selection area 135 can correspondingly be expanded. Thus, the multiplicity of condition keys can simultaneously be displayed in the condition selection area 135 without deterioration of the operability thereof.

Figure 24:
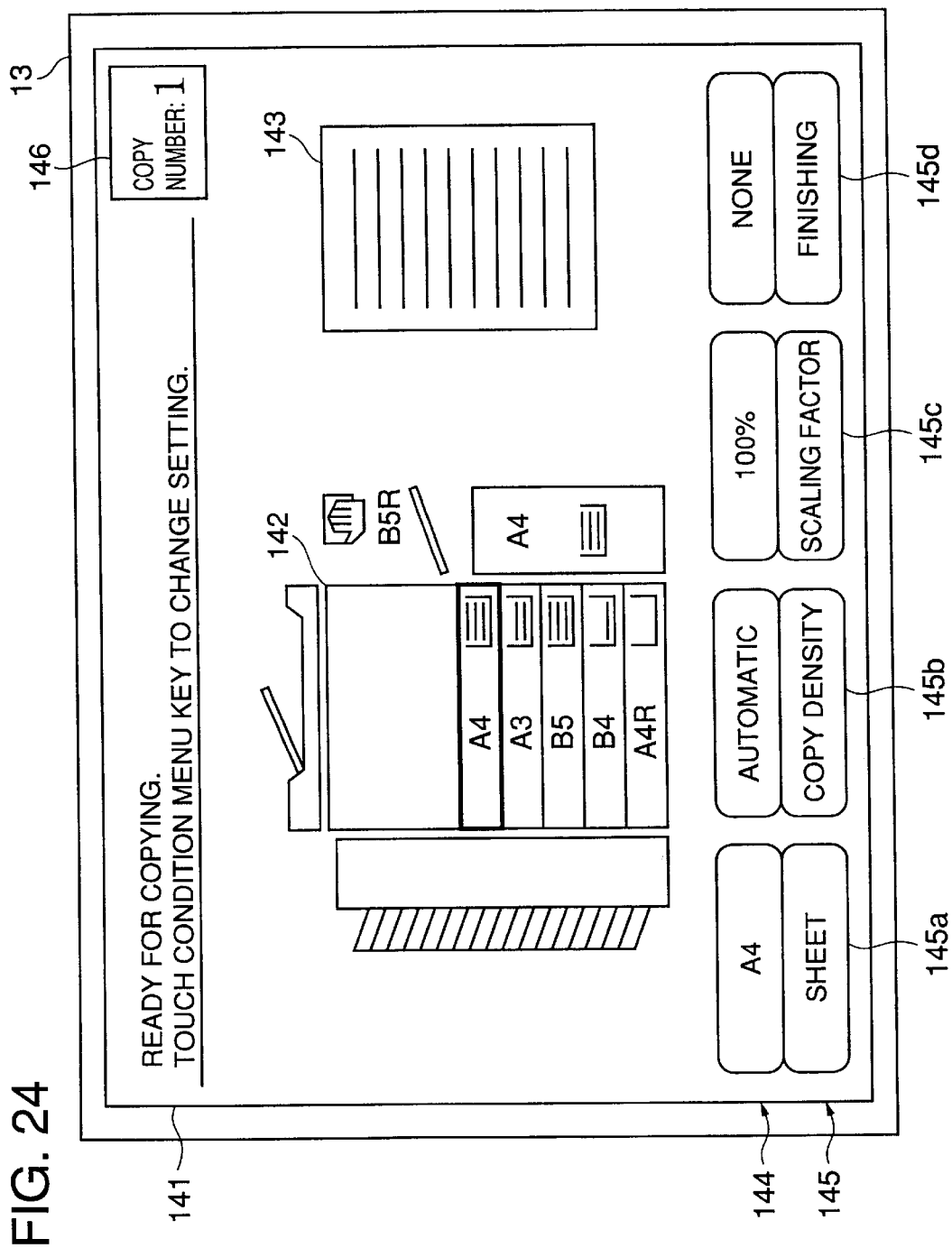
FIG. 24 is a diagram illustrating a screen to be displayed on a display of an apparatus for setting image forming conditions in accordance with a fourth embodiment of the invention.

FIG. 24 is a diagram illustrating a screen to be displayed on a display of an apparatus for setting image forming conditions in accordance with a fourth embodiment of the invention. On the screen of the display 13 of this embodiment, a message area 141 and a copy number display area 146 are located at the top thereof, and a schematic icon 142 and a preview icon 143 indicative of the state of a sheet carrying a copy image formed thereon are displayed in left and right intermediate portions thereof. Further, a condition menu key area 145 containing therein condition menu keys 145a to 145d to be operated for opening condition setting screens to input copying conditions is located at the bottom of the display, and a condition display area 144 for displaying current settings of the copying conditions respectively assigned to the condition menu keys 145a to 145d is located above the condition menu key area 145.

Displayed in the message area 141 is a message for instructing the operator on an operation necessary for setting the copying conditions. The schematic icon 142 schematically illustrates the appearance of the copying machine (image forming apparatus) to indicate the size and volume of sheets accommodated in each of a plurality of sheet containers. The preview icon 143 represents a sheet to be obtained when the copying operation is performed under the inputted copying conditions.

Condition menu keys including a sheet key 145a, a copy density key 145b, a scaling factor key 145c and a finishing key 145d are provided in the condition menu key area 145. Every time the sheet key 145a is operated, a highlight is shifted over sheet container portions of the schematic icon 142 indicative of the plurality of sheet containers, whereby the sheet container to be used for the image forming operation is changed. On the screen shown in FIG. 24, for example, a sheet container portion indicative of an A4-size sheet cassette provided at the topmost of a multiple-cassette sheet feeder is highlighted. Every time the sheet key 145a is operated, the highlight is shifted downward over the sheet container portions of the schematic icon. When the sheet key 145a is operated with the highlight being positioned on a sheet container portion indicative of an A4R-size sheet cassette located at the bottom of the multiple-cassette sheet feeder, a sheet container indicative of a manual feeding tray holding thereon B5R-size sheets is highlighted. When the sheet key 145a is further operated in this state, a sheet container portion indicative of a large-volume cassette containing A4-size sheets is highlighted.

The A4-size sheets are accommodated in the cassette in a landscape orientation as viewed from the front side, while the A4R-size sheets are accommodated in the cassette in a portrait orientation as viewed from the front side. In this embodiment, the orientation of the sheets is also expressed by the notation of the sheet size. Further, the amount of sheets remaining in each of the sheet containers is also indicated in the schematic icon.

Figure 25:
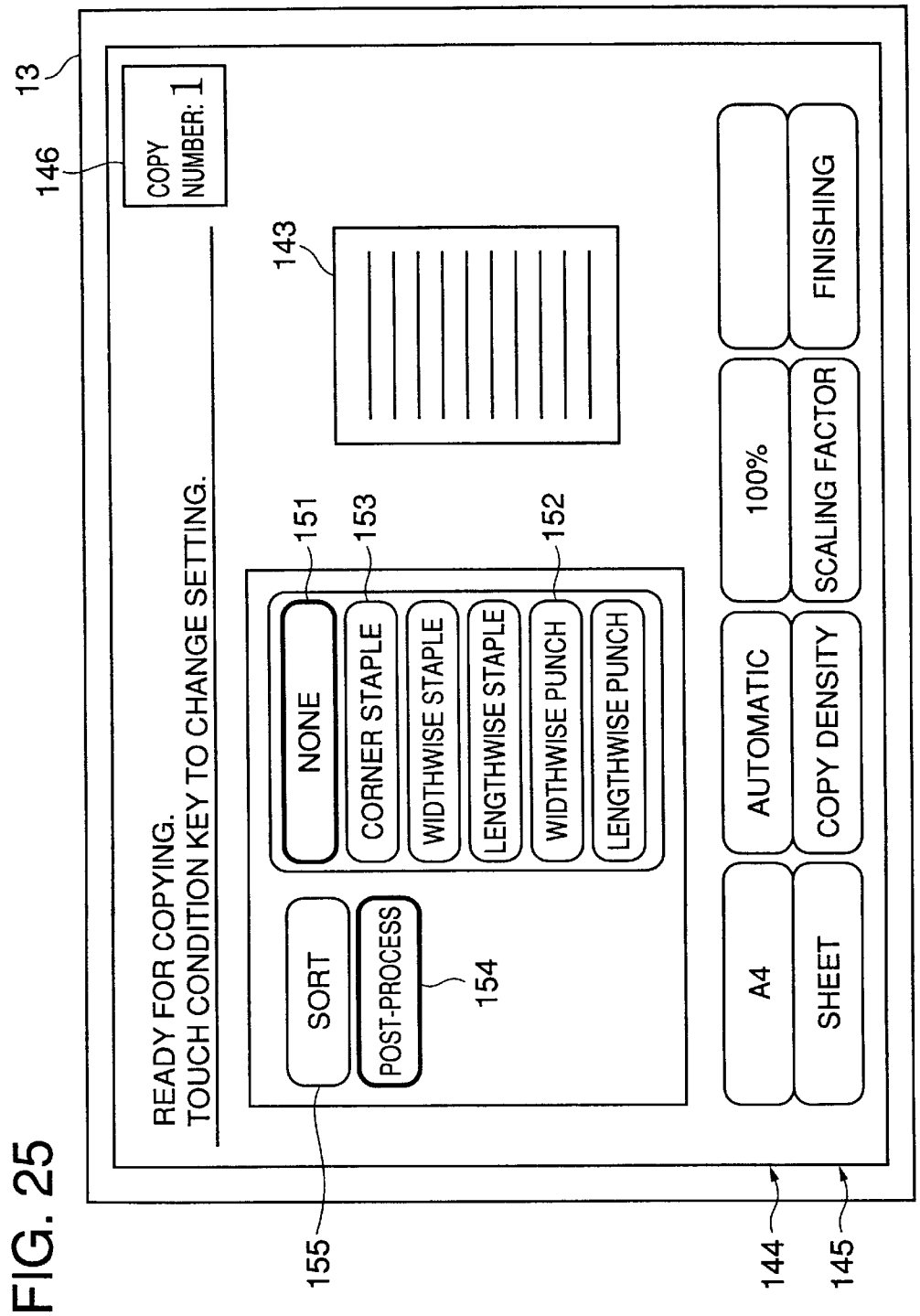
FIG. 25 is a diagram illustrating one exemplary condition setting screen to be displayed on the display in the fourth embodiment.

FIGS. 25, 26, 27 and 28 each illustrate a condition setting screen to be displayed on the display in the fourth embodiment. When the finishing key 145d is operated on the screen shown in FIG. 24, a display area of the condition display area 144 associated with the finishing key 145d becomes blank, and a condition setting screen is displayed for setting conditions for a sorting operation and a post-processing operation as shown in FIG. 25. Since no condition is currently set for the finishing process on the screen shown in FIG. 24, a post-processing key 154 and a none key 151 are highlighted on the condition setting screen shown in FIG. 25 to indicate that no condition is currently set for the post-processing operation. The preview icon 143 represents a copy sheet not subjected to any post-processing operation.

Figure 26:
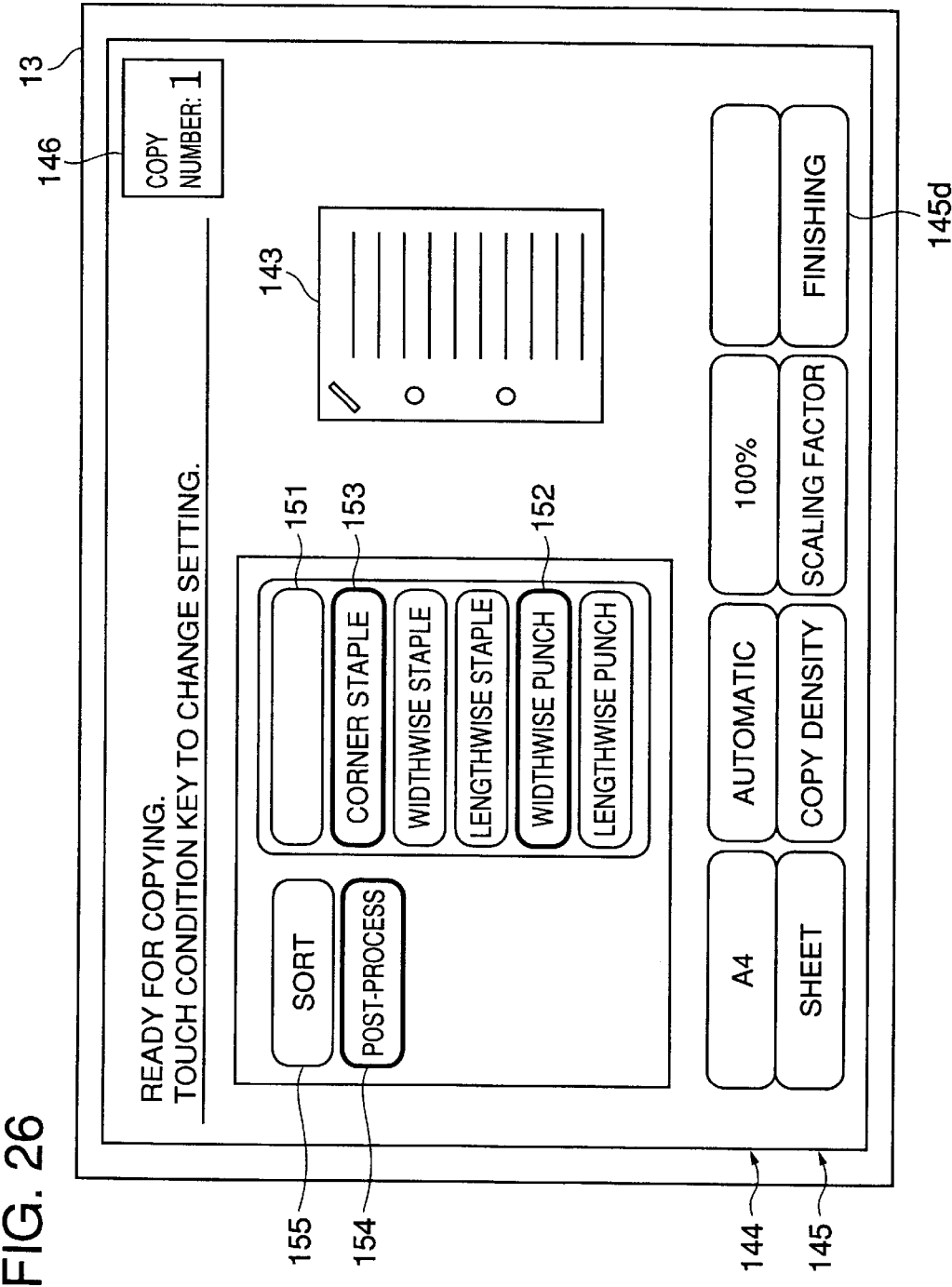
FIG. 26 is a diagram illustrating another exemplary condition setting screen to be displayed on the display in the fourth embodiment.

It is herein assumed that a punching process for punching each copy sheet for formation of binding holes and a stapling process for stapling a stack of plural copy sheets are to be performed in combination as post-processing operations. When a widthwise punch key 152 and a corner staple key 153 are operated, for example, the none key 151 is returned to a normal display state, and the widthwise punch key 152 and the corner staple key 153 are highlighted, as shown in FIG. 26, to indicate that a punching process for formation of binding holes along a left edge of each copy sheet and a stapling process for stapling an upper left corner of a stack of copy sheets have been selected. Further, the preview icon 143 represents the stack of copy sheets formed with binding holes along the left edge thereof and stapled at the upper left corner thereof.

The stapling process can be selected from three types of stapling processes, and the punching process can be selected from two types of punching processes. The stapling process and the punching process may be selected in combination.

Figure 27:
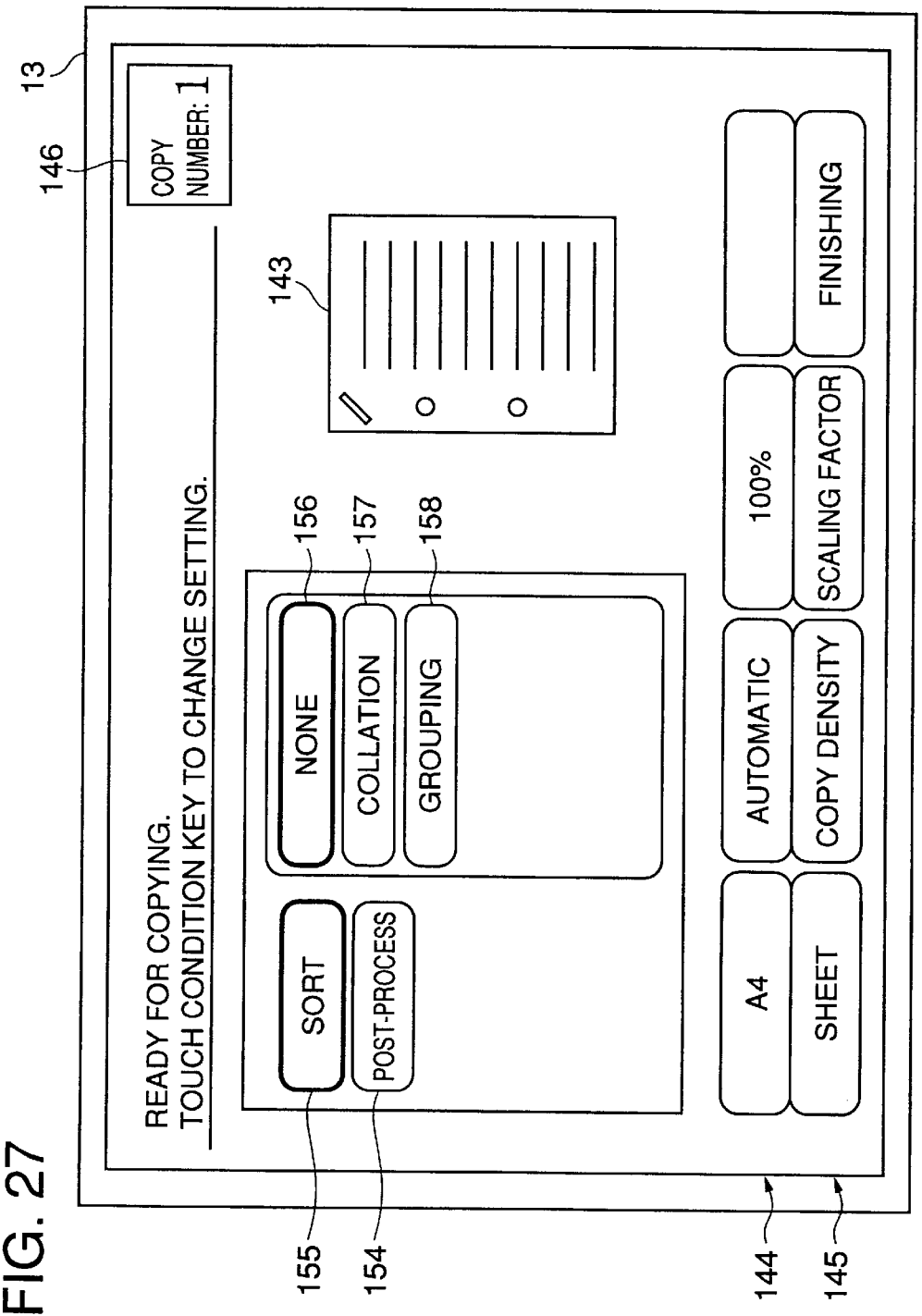
FIG. 27 is a diagram illustrating further another exemplary condition setting screen to be displayed on the display in the fourth embodiment.
Figure 28:
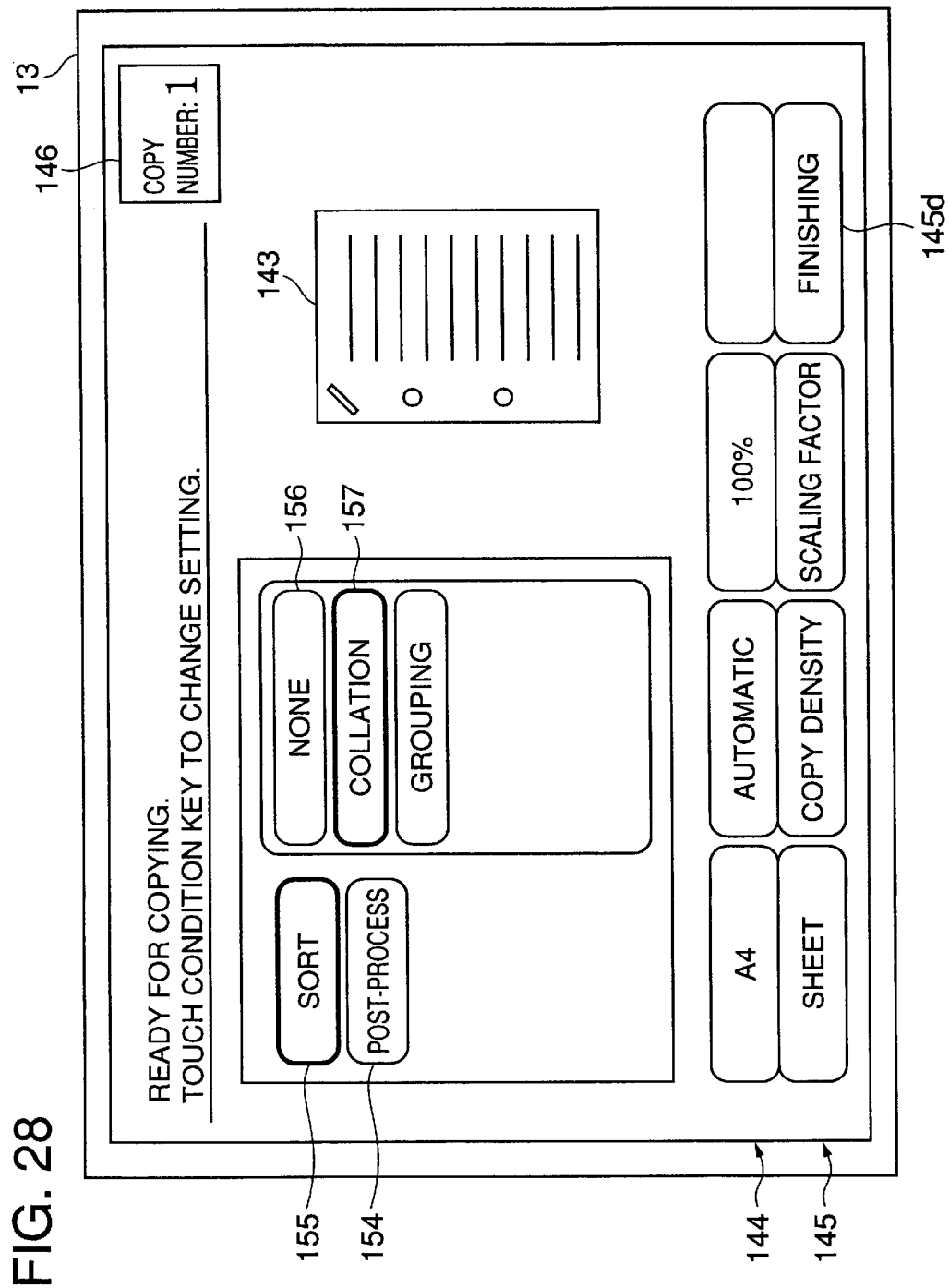
FIG. 28 is a diagram illustrating still another exemplary condition setting screen to be displayed on the display in the fourth embodiment.

When a sort key 155 is operated on the screen shown in FIG. 26, a condition setting screen for the sorting operation is displayed as shown in FIG. 27. At this time, the sort key 155 and a none key 156 are highlighted to indicate that the sorting operation is not selected. When a collation key 157 is operated on the screen shown in FIG. 27, the none key 156 is returned to a normal display sate and the collation key 157 is highlighted as shown in FIG. 28 to indicate that a collating process is selected for discharging a plurality of copy sheets in a collated state. Further, the preview icon 143 represents the plural copy sheets.

When a grouping key 158 is operated on the screen shown in FIG. 27, the none key 156 is returned to the normal display state, and the grouping key 158 is highlighted to indicate that a grouping process is selected for discharging a plurality of copy sheets in a page-by-page grouped state. Either the collating process or the grouping process is selected for the sorting operation.

Figure 29:
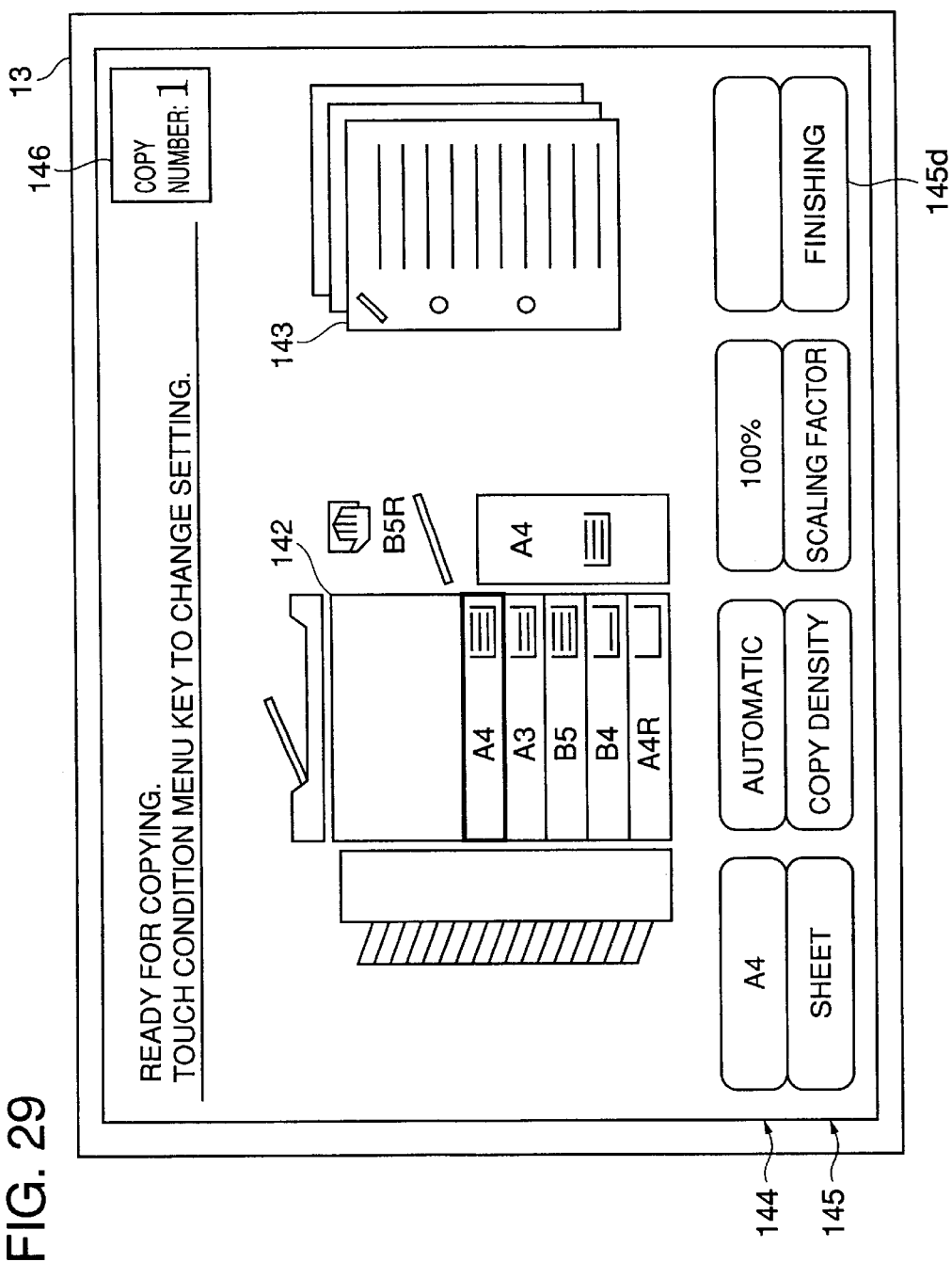
FIG. 29 is a diagram illustrating further another exemplary condition setting screen to be displayed on the display in the fourth embodiment.

When the finishing key 145d is operated on the screen shown in FIG. 26 or 28, a screen as shown in FIG. 29 appears on which text information on a currently selected condition for the finishing process is displayed in a display area of the condition display area 144 associated with the finishing key 145d, and the state of the copy sheet to be obtained when the finishing process is performed under the selected condition is schematically shown in the preview icon 143.

In the condition setting apparatus of this embodiment, the size of a sheet to be used for the copying operation and the position of a sheet container in which the sheet is accommodated are shown in the schematic icon 142, and the state of the copy sheet is schematically shown in the preview icon 143. Further, text information on the settings for the finishing process is displayed in the condition display area 144. Therefore, the operator can quickly confirm the size of the sheet to be used for the copying operation, the position of the sheet container for the sheet and the settings for the finishing process to be performed on the copy sheet by viewing the schematic icon 142 and the preview icon 143 displayed on the screen of the display 13. Further, the operator can confirm the settings for the finishing process by viewing the condition display area 144.

It should be noted that the condition setting apparatus according to the present invention is applicable not only to standalone image forming apparatuses but also to network image forming apparatuses such as network printers and network multi-function machines (printing/copying machines) which are adapted to provide print outputs on the basis of outputs from computer terminals such as personal computers connected thereto via a network.

In accordance with the present invention, the icon schematically representing the current settings of the image forming conditions and the text information on the current settings are displayed in the icon display area and in the condition display area, respectively, on the display screen and, when a condition item is selected, the condition setting keys are displayed on the display screen for setting an image forming condition for the selected condition item. Therefore, an operator can quickly confirm the current settings of the image forming conditions by viewing the icon, and further confirm the current settings by viewing the text information. When the image forming condition for the selected condition item is to be set, the condition setting keys are displayed along with the icon and the text information, so that confirmation of the current settings of the image forming conditions and selection of a different condition item can be achieved without switching the display screen.

Since the icon display area is shifted or the size of the icon display area is reduced when the image forming condition for the selected condition item is to be set, the condition setting key area in which the condition setting keys are displayed can be expanded to a sufficiently large size. Therefore, the condition setting keys can be displayed along with the icon and the text information on the display screen without the need for size increase of the display screen of the display section. Accordingly, there is no need to increase the size of the apparatus.

Further, the relationship between the condition setting keys and an item selection key for the selected condition item is indicated by the indicator when the image forming condition for the selected condition item is to be set. Therefore, the indicator allows for easy confirmation of the selected condition item when a condition setting operation is to be performed on any of the plurality of condition items for setting the plural image forming conditions. Thus, the condition setting operation can easily and correctly be performed.

Since the icon display area, the condition setting key area, the condition display area and the item selection key area are located in this order from the top to the bottom of the display screen when the image forming condition for the selected condition item is to be set, neither the icon display area nor the condition display area are shaded with an operator's hand when the operator operates any of the condition setting keys or any of the item selection keys. Therefore, the operator can correctly recognize the displayed information. Where the indicator is displayed in the condition display area in association with the item selection key for the selected condition item to indicate the relationship between the item selection key and the condition setting keys, the relationship can easily and definitely be indicated without significantly altering the configuration of the display screen. This ensures easy confirmation of the information displayed on the display screen without the need for size increase of the display screen.

Further, the relationship between the sheet size and the copy image size determined on the basis of the settings of the image forming conditions is indicated by the copy icon. Therefore, the operator can quickly check whether or not the settings of the image forming conditions such as the sheet size and the copy scaling factor are proper by viewing the copy icon.

The dimensional relationship between the copy image and the sheet is indicated by the copy icon irrespective of the actual sizes of the copy image and the recording sheet. Even if the actual sizes of the copy image and the recording sheet are variable in a wide range, there is no need to increase the size of the display screen to accommodate therein an excessively large copy icon, and there is no possibility to display an excessively small copy icon with a lower legibility. Therefore, easy confirmation of the image forming conditions can be ensured without the need for size increase of the apparatus.

Further, the text information on the sheet size is displayed along with the copy icon. Therefore, the operator can intuitively check whether or not the settings of the image forming conditions are proper by viewing the copy icon, and confirm the settings of the image forming conditions by viewing the text information. Thus, the image forming conditions can easily and correctly be set in a short time.

The message indicative of improper settings of the image forming conditions is displayed along with the copy icon indicative of the copy state. Therefore, whether or not the settings of the image forming conditions are proper can intuitively and quickly be checked by viewing the icon, and checked again by viewing the text message. Thus, the image forming conditions can easily and correctly be set in a short time.

What is claimed is:

1. An apparatus for setting image forming conditions for an image forming apparatus adapted to form on a recording sheet a copy image obtained by processing an original image under the image forming conditions, the condition setting apparatus comprising:

a display section having a display screen;

a transparent touch-sensitive panel having a plurality of touch-sensitive keys and provided on the display screen for inputting the image forming conditions; and a display control section for controlling the display section and the touch-sensitive panel;

wherein the display control section controls the display section to display a plurality of item selection keys in an item selection key area on the display screen for selection of condition items for setting the image forming conditions, to display a plurality of condition setting keys in a condition setting key area on the display screen for selection of options for a selected condition item, to display text information on current settings of the image forming conditions in a condition display area on the display screen, and to display an icon indicative of the current settings of the image forming conditions in an icon display area on the display screen;

wherein the item selection keys and the condition setting keys are provided in association with the touch-sensitive keys of the touch-sensitive panel;

wherein the condition setting key area appears in response to selection of the condition item for setting the image forming condition for the selected condition item by selectively operating the touch-sensitive keys associated with the condition setting keys; and wherein the display control section controls the display section to display an indicator on the display screen to indicate a relationship between an item selection key for the selected condition item displayed in the item selection key area and the condition setting keys displayed in the condition setting key area in response to the selection of a condition item.

2. An apparatus as set forth in claim 1, wherein the display control section controls the display section to shift the icon display area or reduce the size of the icon display area on the display screen in response to the selection of the condition item.

3. An apparatus as set forth in claim 2, wherein the display control section controls the display section to locate the icon display area, the condition setting key area and the item selection key area in this order from the top to the bottom of the display screen in response to the selection of the condition item.

4. An apparatus as set forth in claim 1, wherein the display control section controls the display section to locate the icon display area, the condition setting key area and the item selection key area in this order from the top to the bottom of the display screen in response to the selection of the condition item.

5. An apparatus for setting image forming conditions for an image forming apparatus adapted to form on a recording sheet a copy image obtained by processing an original image under the image forming conditions, the condition setting apparatus comprising:

a display section having a display screen;

a transparent touch-sensitive panel having a plurality of touch-sensitive keys and provided on the display screen for inputting the image forming conditions; and a display control section for controlling the display section and the touch-sensitive panel;

wherein the display control section controls the display section to display a plurality of item selection keys in an item selection key area on the display screen for selection of condition items for setting the image forming conditions, to display a plurality of condition setting keys in a condition setting key area on the display screen for selection of options for a selected condition item, to display text information on current settings of the image forming conditions in a condition display area on the display screen, and to display an icon indicative of the current settings of the image forming conditions in an icon display area on the display screen;

wherein the item selection keys and the condition setting keys are provided in association with the touch-sensitive keys of the touch-sensitive panel;

wherein the condition setting key area appears in response to selection of the condition item for setting the image forming condition for the selected condition item by selectively operating the touch-sensitive keys associated with the condition setting keys; and wherein the display control section controls the display section to display a copy icon indicative of a copy state in the icon display area on the display screen, the copy icon comprising a frame icon representing the recording sheet and having a size determined on the basis of a sheet size set as one of the image forming conditions and a copy image icon representing a copy image and having a size determined on the basis of an original document size and settings of the other image forming conditions, the frame icon and the copy image icon being displayed in a superimposed relation with respect to a reference display position.

6. An apparatus as set forth in claim 5, wherein the copy icon is an icon indicative of a dimensional relationship between the copy image and the sheet.

7. An apparatus as set forth in claim 6, wherein the display control section controls the display section to display text information on the sheet size in association with the copy icon on the display screen.

8. An apparatus as set forth in claim 5, wherein the display control section controls the display section to display text information on the sheet size in association with the copy icon on the display screen.

9. An apparatus as set forth in claim 8, wherein the display control section controls the display section to display on the display screen a text message that the settings of the image forming conditions are improper, if the copy image icon has a size longitudinally or transversely incompatible with a size of the frame icon when the copy icon is displayed.

10. An apparatus as set forth in claim 5, wherein the copy icon is an icon indicative of a dimensional relationship between the copy image and the sheet, and wherein the display control section controls the display section to display text information on the sheet size in association with the copy icon on the display screen.

11. An apparatus as set forth in claim 10, wherein the copy icon is an icon indicative of a dimensional relationship between the copy image and the sheet, wherein the display control section controls the display section to display text information on the sheet size in association with the copy icon on the display screen, wherein the display control section controls the display section to display text information on the sheet size in association with the copy icon on the display screen, and wherein the display control section controls the display section to display on the display screen a text message that the settings of the image forming conditions are improper, if the copy image icon has a size longitudinally or transversely incompatible with a size of the frame icon when the copy icon is displayed.

* * * * *